(12) United States Patent
Bollman

(10) Patent No.: US 12,000,419 B1
(45) Date of Patent: *Jun. 4, 2024

(54) UNIVERSAL MOUNT PLATFORM FOR MODULAR WORKSTATIONS

(71) Applicant: Clifford Bollman, Sun City West, AZ (US)

(72) Inventor: Clifford Bollman, Sun City West, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,317

(22) Filed: Jan. 17, 2022

Related U.S. Application Data

(63) Continuation of application No. 17/027,705, filed on Sep. 22, 2020, now Pat. No. 11,236,774, which is a continuation-in-part of application No. 16/404,614, filed on May 6, 2019, now Pat. No. 10,781,841.

(60) Provisional application No. 63/080,789, filed on Sep. 20, 2020.

(51) Int. Cl.
| | |
|---|---|
| *F16M 11/00* | (2006.01) |
| *A47B 13/02* | (2006.01) |
| *A47B 21/04* | (2006.01) |
| *E04C 3/04* | (2006.01) |
| *E04C 3/29* | (2006.01) |
| *F16B 12/44* | (2006.01) |
| *F16B 7/18* | (2006.01) |

(52) U.S. Cl.
CPC ............ *F16B 12/44* (2013.01); *A47B 13/02* (2013.01); *A47B 21/04* (2013.01); *E04C 3/04* (2013.01); *E04C 3/29* (2013.01); *A47B 2200/0016* (2013.01); *E04C 2003/0413* (2013.01); *E04C 2003/0421* (2013.01); *E04C 2003/0439* (2013.01); *E04C 2003/0465* (2013.01); *F16B 7/187* (2013.01)

(58) Field of Classification Search
CPC ........ E04C 2003/0465; E04C 3/04; E04C 3/29; E04C 2003/0413; E04C 2003/0421; E04C 2003/0439; F16B 12/44; F16B 7/187; A47B 2200/0016; A47B 13/02; A47B 21/04

See application file for complete search history.

(56) References Cited

U.S. PATENT DOCUMENTS

| | | | | |
|---|---|---|---|---|
| 2004/0250503 | A1* | 12/2004 | Bigelow | H02G 3/0412 52/838 |
| 2010/0018153 | A1* | 1/2010 | Garau | E04C 3/06 228/150 |
| 2015/0316179 | A1* | 11/2015 | Jarvis | E04C 3/00 138/143 |

* cited by examiner

*Primary Examiner* — Amy J. Sterling

(74) *Attorney, Agent, or Firm* — Rylander & Associates, PC; Philip R. M. Hunt

(57) ABSTRACT

A universal mount platform for office and industrial modular workstations including embodiments of an N-side slot mount matrix. The N-side slot mount matrix also includes an N number of outer rails arranged in a N-sided polygon, where N is an integer, each of the outer rails having two outer rail ends, each of the two outer rail ends coupled to one of the outer rail ends of another one of the outer rails. The N-side slot mount matrix has an N number of inner rails, each of the inner rails having a first end coupled to one of the outer rails and a second fend coupled to another one of the inner rails. The N-side slot mount matrix has an N number of mount slots, each between one of the inner rails and an adjacent one of the outer rails.

12 Claims, 27 Drawing Sheets

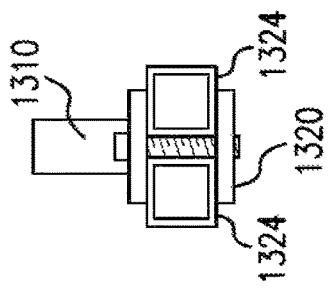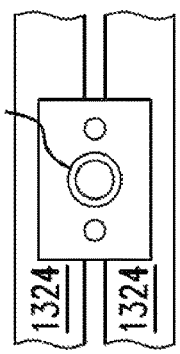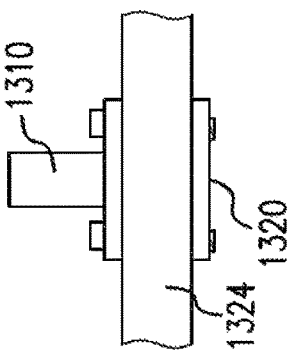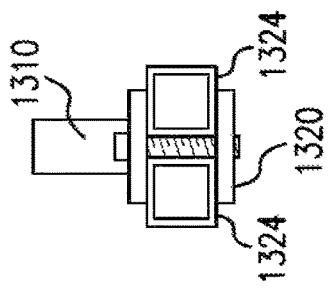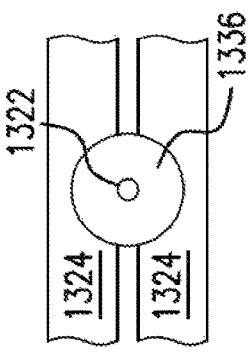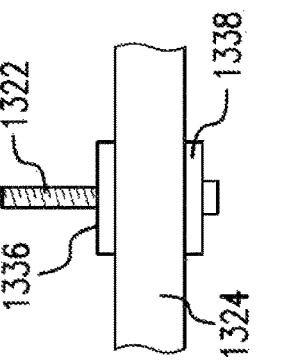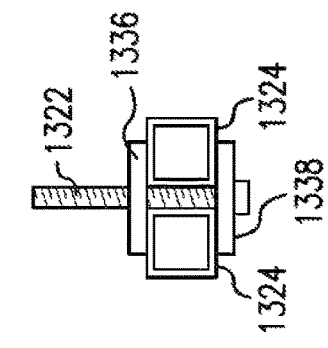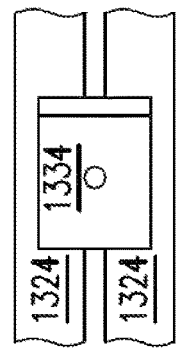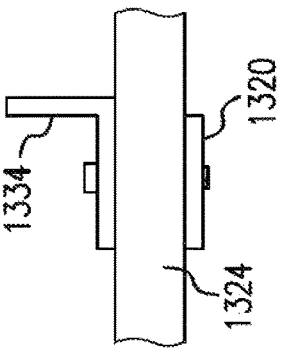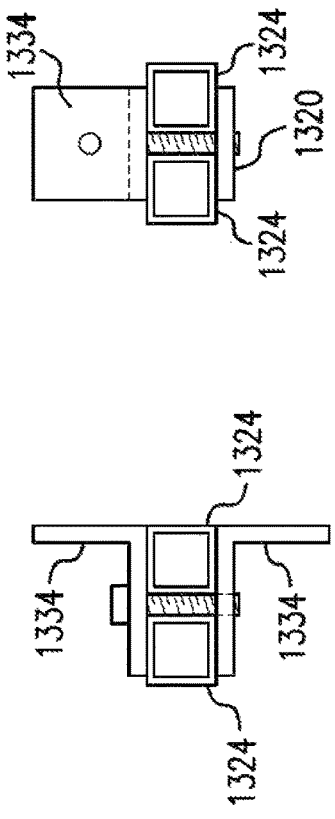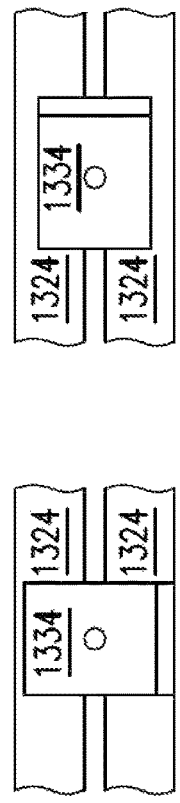

UNIVERSAL MOUNT PLATFORM FOR MODULAR WORKSTATIONS

CROSS-REFERENCE TO RELATED APPLICATION

The present application is a continuation of application Ser. No. 17/027,705, filed 2020 Sep. 22, which is a continuation-in-part application of application Ser. No. 16/404,614, filed 2019 May 6, now U.S. patent Ser. No. 10/781,841, issued 2020 Sep. 22, all incorporated herein by reference. This application, though Application No. 17027705, claims the benefit of U.S. Provisional Application No. 63/080,789, filed 2020 Sep. 20, incorporated herein by reference.

TECHNICAL FIELD

The present invention relates to modular assembly systems. More particularly, the present invention relates to modular assembly systems for office and industrial workstations.

BACKGROUND

Modular building assembly systems have long been available to for the construction and erection of various structures such as office cubicles, industrial workstations, and scaffolding. Such modular building assembly systems often lack durability, strength and flexibility.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures.

FIGS. 30A, 30B, and 30C respectively show a side sectional view, a top view, and a front view of a pair of L brackets clamped together on a pair of rails.

FIGS. 31A, 31B, and 31C respectively show a side sectional view, a top view, and a front view of an L bracket clamped with a threaded backer plate on a pair of rails.

FIGS. 32A, 32B, and 32C respectively show a side sectional view, a top view, and a front view of a fastener passing through an unthreaded washer and engaging a threaded washer to clamp a pair of rails.

FIGS. 33A, 33B, and 33C respectively show a side sectional view, a top view, and a front view of a post clamped to a threaded backer plate on the pair of rails.

DETAILED DESCRIPTION

In describing the one or more representative embodiments of the inventive subject matter, use of directional terms such as "upper," "lower," "above," "below", "in front of," "behind," etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business-related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. As such, the scope of the inventive subject matter should not be limited by the particular embodiments herein described but should be defined only by the appended claims and equivalents thereof.

Universal Mount Platform System

The Universal Mount Platform System is a flexible system for building ergonomic working stations that maximizes three-dimensional utilization of a workspace. The Universal Mount Platform comprises substructure modules and positioning holders. The substructure modules provide the foundation on which the positioning holders may be mounted. The positioning holders hold physical components needed for the work of the workstation, such as tabletops or other work surfaces, lighting fixtures, computer monitors, cable management, and storage bins.

Rails

Figure 4B:
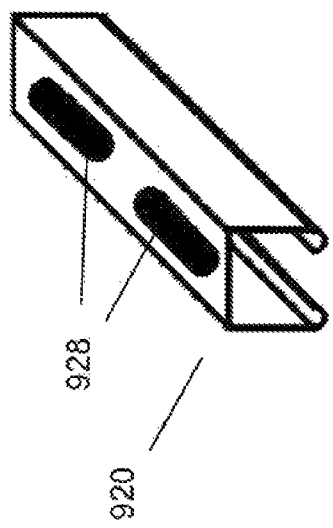
FIG. 4B shows a slotted strut channel rail.
Figure 4D:
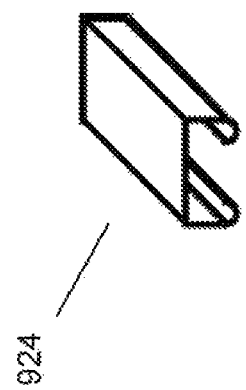
FIG. 4D shows a half-height strut channel rail.
Figure 4A:
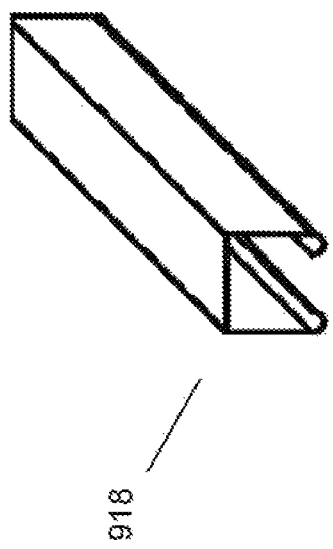
FIG. 4A shows a strut channel rail.

Rails are the primary horizontal strength members in the Universal Mount Platform. A rail is a tube, typically rectangular or square in cross section (see e.g. rail 504 in FIG. 1). In alternative embodiments, a rail may have a different cross-section, such as circular. Square tube rails are typically 1¼ inch square cross-section, 14-gauge tube thickness, but may have other suitable dimensions. Length of rails are typically 30 to 120 inches. In some alternative embodiments, a rail is a channel bar, rectangular or square in cross-section. In yet other alternative embodiments, the rail is a strut channel, rectangular or square in cross-section, with inwards-curving lips to facilitate mounting of components (see e.g. strut channel rail 918 in FIG. 4A). Strut channel rails typically have a 1⅝ by 1⅝ inch square cross section but may have other suitable dimensions. In some embodiments, the strut channel rails have reinforcing bars across the open front of the channel at intervals along the length of the rail. In some embodiments, a rail may have fastener holes spaced at intervals along the rail to facilitate coupling to other rails, to position holders, slices, etc. (See e.g. rail 504 with fastener holes 514 in FIG. 1 and FIG. 2 and perforated strut channel rail 922 with fastener holes 926 in FIG. 50C). The fastener holes typically penetrate through the rail orthogonal to the long axis of the rail. The fastener holes are typically circular but may be elongated slots in some embodiments (see e.g. slotted strut channel rail 920 with slots 928 in FIG. 4B). Perforated rails typically have fastener holes at 2-inch intervals. The fastener holes in the rails are typically unthreaded, but some may be threaded. A rail is typically made of metal, such as steel, but may be made of other suitable materials. In some embodiments, the rails may have end plates with fastener holes that may be threaded.

Rail Splices

Rail splices are used to couple two or more rails. At least three different rail splices may be used in the Universal Mount Platform—an in-line splice 624, a perpendicular rail splice 628, and a clip splice 634.

Figures 1, 2:
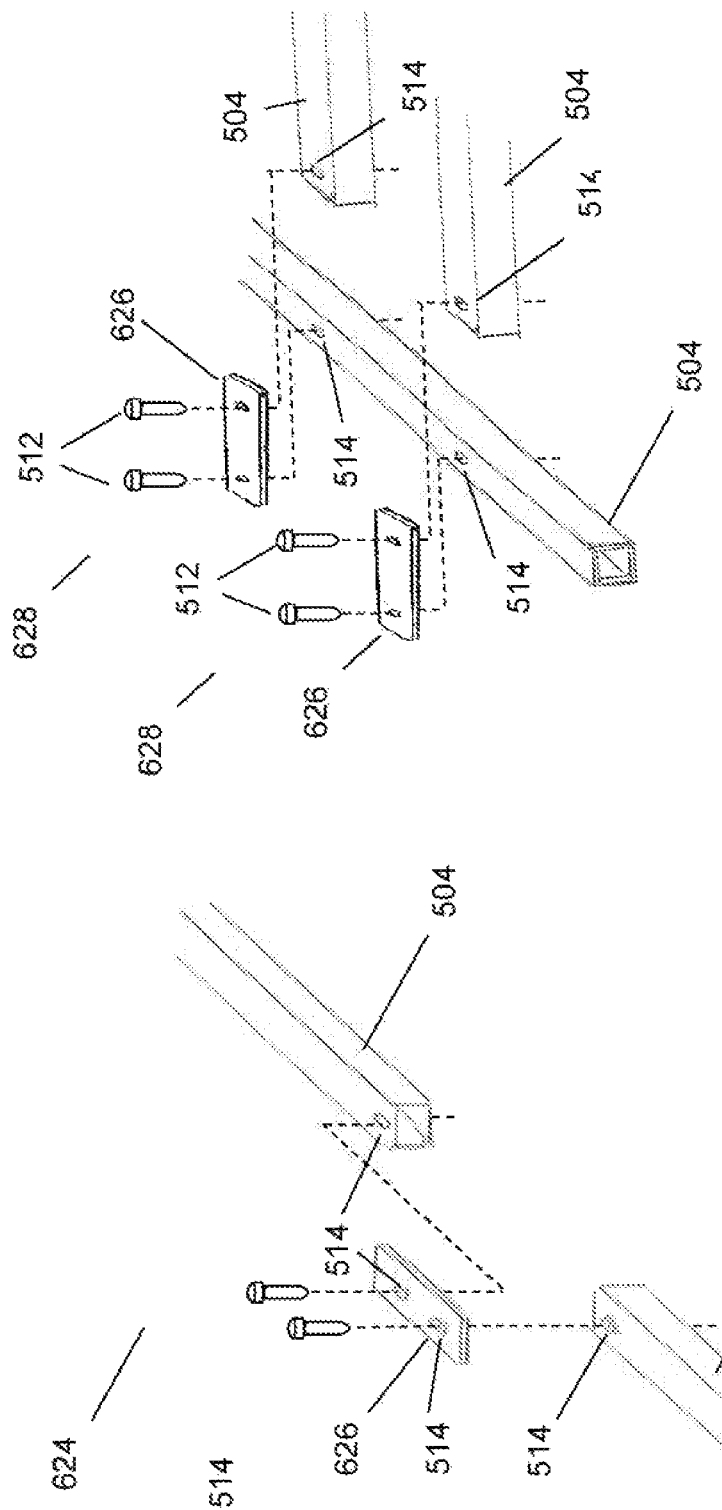
FIG. 1 shows an exploded perspective view of an in-line splice.
FIG. 2 shows an exploded perspective view of two perpendicular rail splices.

FIG. 1 shows an exploded perspective view of an in-line splice 624 connecting two rails 504 that are in-line which each other and abut each other. The in-line rail splice 624 comprises two fasteners 512 and a nut plate 626 with a first fastener hole 514 and a second fastener hole 514. When coupling the two rails 504, the first fastener hole 514 is configured to line up with a fastener hole 514 in one rail 504 through which one of the fasteners 512 is passed. The second fastener hole 514 is configured to line up with a fastener hole 514 in the other rail 504 through which the other fastener 512 is passed. The fastener 512 may be a rivet, a threaded cap screw and nut or other appropriate type of fastener. The fastener holes 514 are typically unthreaded but may be threaded. In some embodiments, each in-line rail splice 624 has two nut plates 626, one above the rails 504 and the other below.

FIG. 2 shows an exploded perspective view of two perpendicular rail splices 628 connecting a single rail 504 to a pair of parallel rails 504 that are parallel to each other and perpendicular to the single rail 504. Each perpendicular rail splice 628 comprises two fasteners 512 and a nut plate 626 with a first fastener hole 514 and a second fastener hole 514. When coupling the single rail 504 to the set of parallel rails, the first fastener hole 514 is configured to line up with a fastener hole 514 in the single rail 504 through which one of the fasteners 512 is passed. The second fastener hole 514 is configured to line up with a fastener hole 514 in one of the rails 504 in the parallel set of rails 504 through which the other fastener 512 is passed. The fastener 512 may be a rivet, a threaded cap screw and nut or other appropriate type of fastener. The fastener holes 514 are typically unthreaded but may be threaded. In some embodiments, each perpendicular rail splice 628 has two nut plates 626, one above the rails 504 and the other below.

Figure 3:
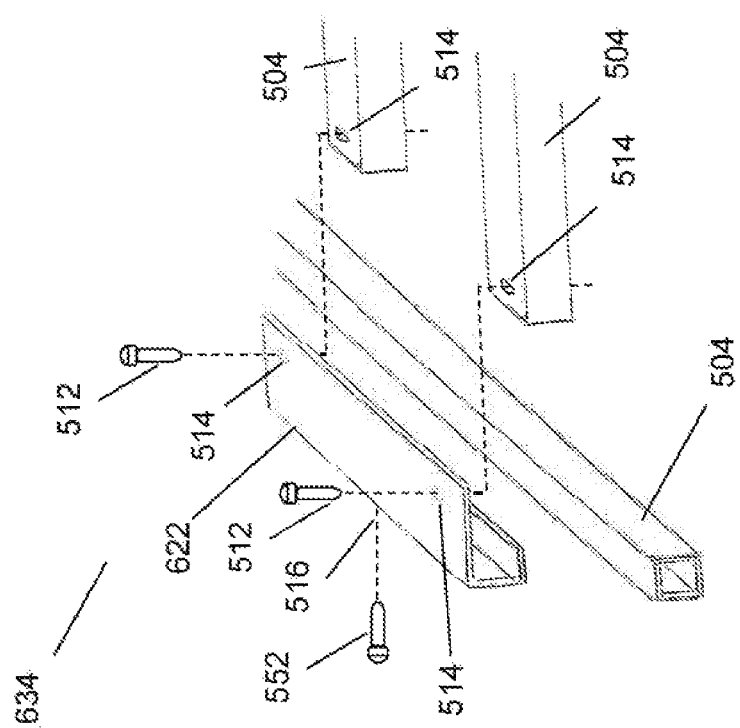
FIG. 3 shows an exploded perspective view of a clip splice.

FIG. 3 shows an exploded perspective view of a clip splice 634. The clip splice 634 connects a single rail 504 to a set of parallel rails 504 that are parallel to each other and perpendicular to the single rail 504. The clip splice 634 comprises a double-rail-to-single-rail clip 622 having a cross-sectional with three sides of a rectangle that allows the single rail 504 to nest therein with a sliding fit. The parallel rails 504 have fastener holes 514 near the ends closest to the double-rail-to-single-rail clip 622, which has two fastener holes 514 in a lip that overhangs the single bar 504 when the single rail 504 is nested within the double-rail-to-single-rail clip 622. With the double-rail-to-single-rail clip 622 clipped on to the single rail 504, two fasteners 512, such as a threaded screws, rivets or other fastening mechanisms pass through the two fastener holes 514 of the double-rail-to-single-rail clip 622 and the parallel rails 504, securing the parallel rails 504 to the single rail 504. The double-rail-to-single-rail clip 622 allows the parallel rails 504 to slide laterally relative to the single rail 504. In some embodiments, the clip splice 634 has a threaded hole 516 with a set screw 552 inserted therein. The set screw 552 can be tightened to engage the rail 504, holding the clip splice 634 in place on the single rail 504, or loosened to disengage from the single rail 504, allowing the clip splice 634 to slide along the single rail 504.

Triple Vertical Mount Track Column

Figure 4C:
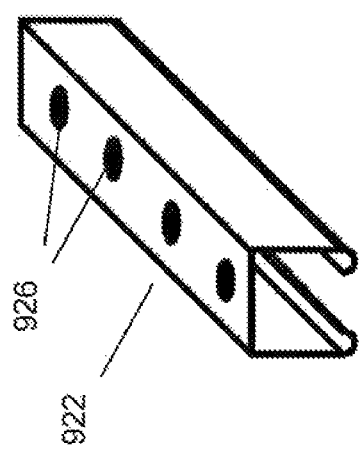
FIG. 4C shows a perforated strut channel rail.
Figure 5:
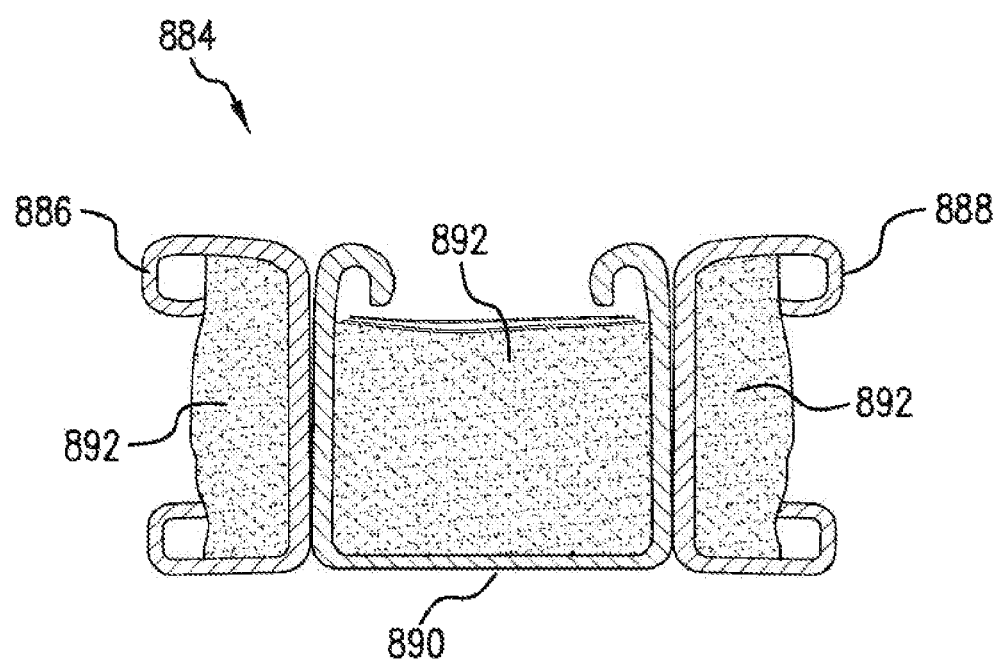
FIG. 5 shows a cross sectional view of an embodiment of a triple vertical mount track column.

FIG. 5 shows a cross sectional view of an embodiment of a standing triple vertical mount track column 884. The standing triple vertical mount track column 884 comprises a center channel 890 with a left channel 886 and a right channel 888 coupled thereto, typically by welding, but in other embodiments, by bolting or other suitable mechanism. The center channel 890, left channel 886 and right channel 888 are typically strut channels, each with lips curving into their respective channel opening, which themselves are typically filled with nut retaining foam 892. The center channel 890 is typically a perforated strut channel, similar to the perforated strut channel rail 922 in FIG. 4C or a slotted strut channel, similar to the slotted strut channel rail 920 in FIG. 4B. The left channel 886 and right channel 888 are typically half height strut channels, similar to the half-height strut channel 924 show in FIG. 4D. The standing triple vertical mount track column 884 has a top plate and a bottom plate coupled thereto, typically by welding. The standing triple vertical mount track column 884 is typically 48 inches in height.

First Embodiment Quad Mount Track Matrix

Figure 6:
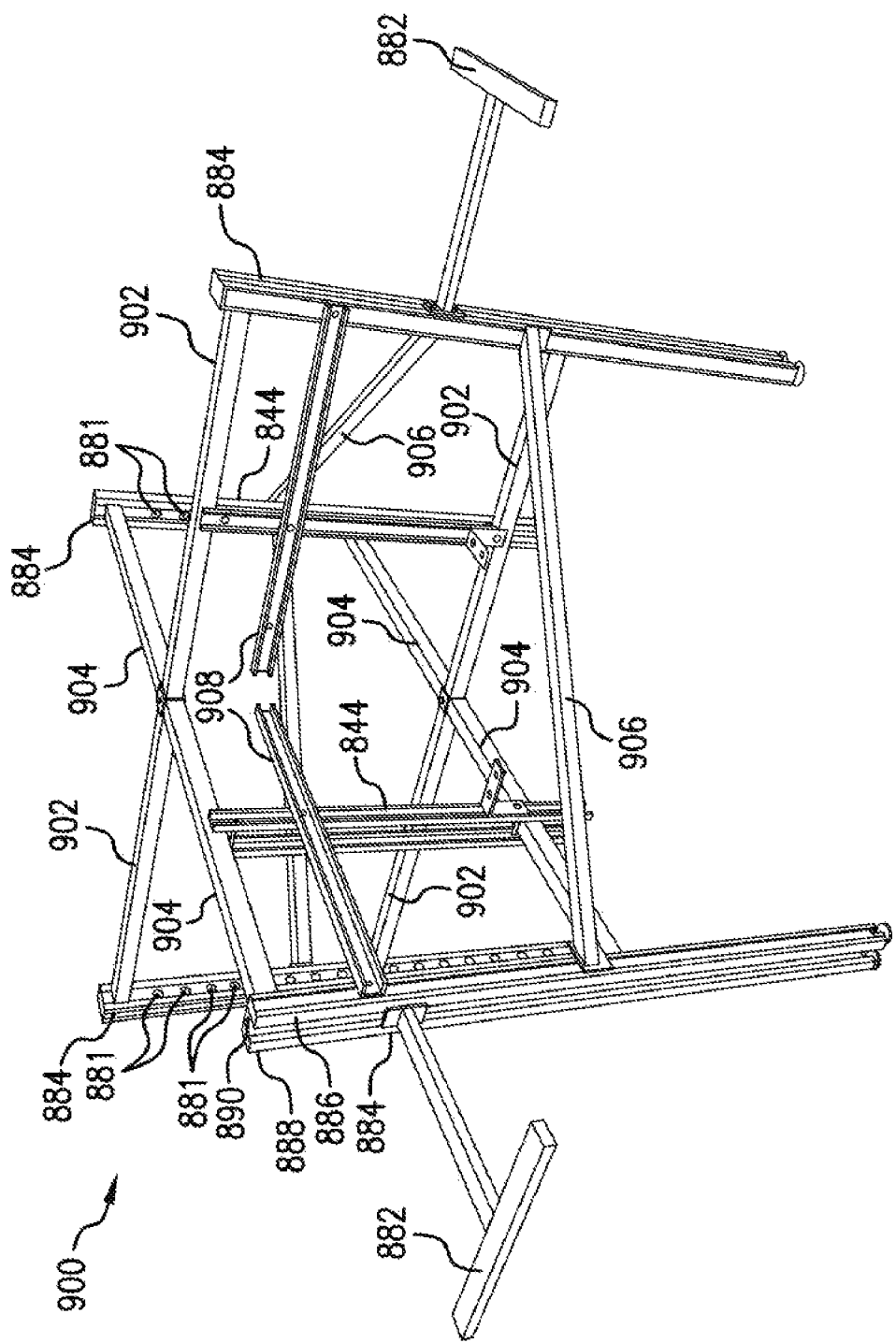
FIG. 6 shows a representative embodiment of a quad mount track matrix with various accessories attached thereto.

FIG. 6 shows a first representative embodiment of a quad mount track matrix 900 with various accessories attached thereto. The quad mount track matrix 900 comprises four triple vertical mount track columns 884 arranged in a rectangle, coupled by various rails. The rails of the quad mount track matrix 900 include upper and lower cross rails 902 with ends coupled to a first triple vertical mount track columns 884 and a second standing triple vertical mount track column 884 on an opposite corner of the rectangle. Upper and lower center sleeve rails 904 couple a third standing triple vertical mount track column 884 to a fourth standing triple vertical mount track column 884. A sleeve in the center of each center sleeve rail 904 allows the upper and lower cross rails 902 to respectively pass through the upper and lower center sleeve rails 904. The lower cross rails 902 and lower center sleeve rails 904 are typically coupled halfway up the triple vertical mount track columns 884, and the upper cross rails 902 and upper center sleeve rails 904 are typically coupled to the tops of the triple vertical mount track columns 884. A set of four lateral rails 906 connect adjacent triple vertical mount track columns 884 to each other. The lateral rails 906 have angled end plates to match the angle they meet the side channels of the triple vertical mount track columns 884. In alternative embodiments, the lateral rails 906 do not have angled end plates and do not connected directly to the triple vertical mount track columns 884, but instead coupled on to L brackets 930 that are coupled to the triple vertical mount track columns 884 with strut nuts. The lateral rails 906 are typically coupled to the triple vertical mount track columns 884 just above the lower cross rails 902. All the standing triple vertical mount track column 884 are coupled to various rails with bolts passing through bolt holes in end plates of the rails and engaging with nuts in the respective channels of the triple vertical mount track columns 884.

The quad mount track matrix 900 in FIG. 6 is shown with two floating twin vertical mount track columns 844, one clamped to the cross rails 902 and the other clamped to the center sleeve rails 904. Each floating twin vertical mount track column 844 comprises two channels coupled with bolts passing through bolt holes in the backs of the channels. When tightened, the bolts pinch the channels against the rails 902, 904. Some of the bolts may also rest atop the rails 902, 904.

Two horizontal mount tracks 908, are each coupled to their respective floating twin vertical mount track column 844 and standing triple vertical mount track column 884 with bolts and nuts in the respective channels. The floating twin vertical mount track column 844 and the horizontal mount tracks 908 provide locations to attach accessories in the interior of the quad mount track matrix 900. Accessories and/or positioning holders for the accessories may be coupled to these channels with strut nuts, allowing the accessory to be easily positioned and repositioned along the channel without drilling additional holes. For example, two T support arms 882 are shown, coupled to different triple vertical mount track columns 884 and two L brackets 930 are coupled to two of the floating twin vertical mount track columns 844 with strut nuts.

Second Embodiment Quad Mount Track Matrix

Figure 10:
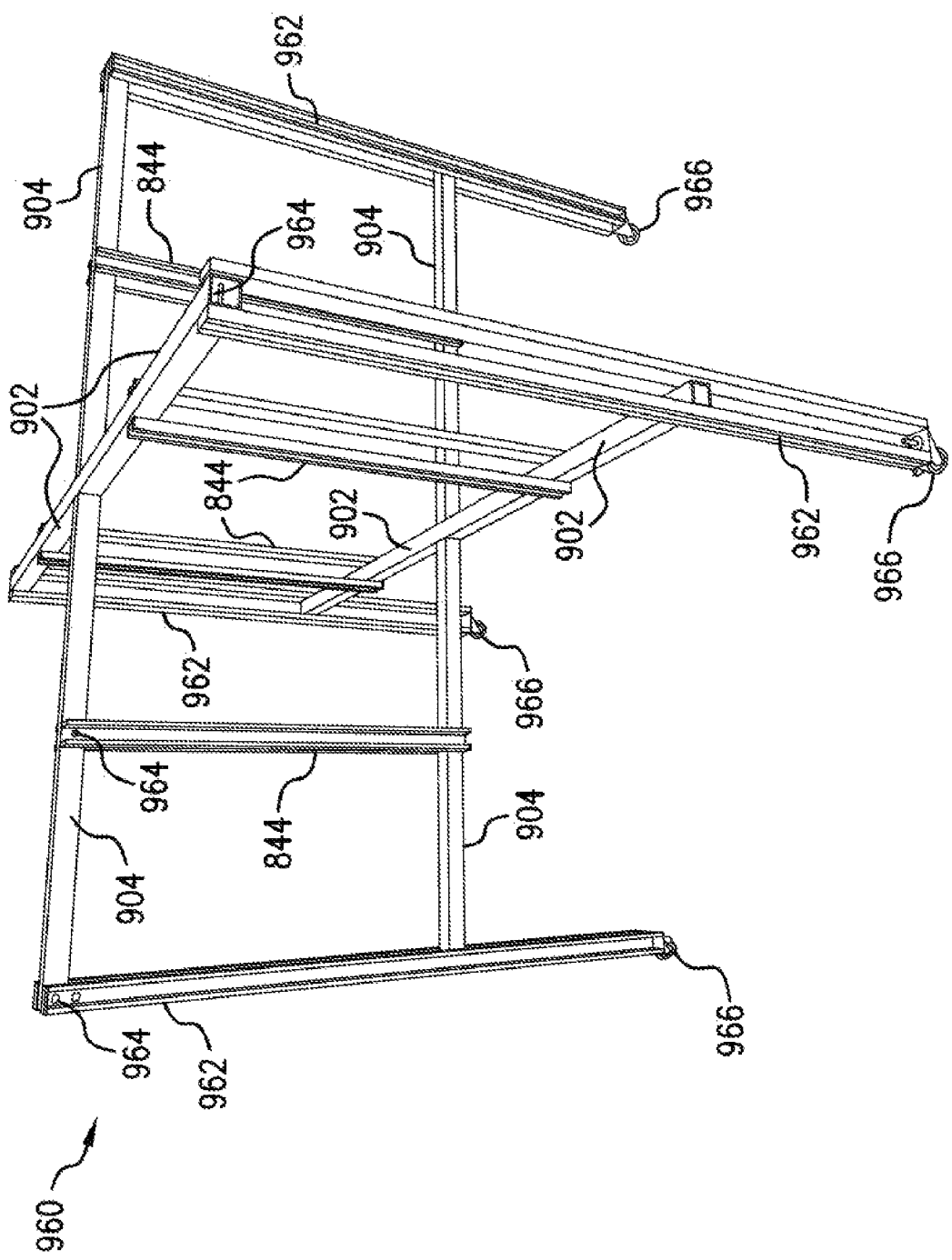
FIG. 10 shows a second representative embodiment of a quad mount track matrix.

FIG. 10 shows a second representative embodiment of a quad mount track matrix 960. The quad mount track matrix 960 comprises four standing twin vertical mount track columns 962 arranged in a rectangle, coupled by various rails. Each of the standing twin vertical mount track column 962 comprises two channels coupled with bolts 964 passing through bolt holes in the backs of the channels. Each of the channels has an end plate on a top end with a bolt hole therein to accommodate connection of accessories. Each standing twin vertical mount track column 962 has an endplate with a bolt hole therein and a caster 966 coupled through the bolt hole. In the second embodiment, the bolts 964 pass through bolt holes in the rails 902, 904. In alternative embodiments, the bolts 964 pass under and/or over the rails 902, 904 and when tightened, the bolts 964 pinch the channels against the rails 902, 904.

The rails of the second embodiment quad mount track matrix 960 include upper and lower cross rails 902 with ends coupled to a first standing twin vertical mount track column 962 and a second standing twin vertical mount track column 962 on an opposite corner of the rectangle. Upper and lower center sleeve rails 904 couple a third standing twin vertical mount track column 962 to a fourth standing twin vertical mount track column 962. A sleeve in the center of each center sleeve rail 904 allows the upper and lower cross rails 902 to respectively pass through the upper and lower center sleeve rails 904. The lower cross rails 902 and lower center sleeve rails 904 are typically coupled halfway up the standing twin vertical mount track columns 962, and the upper cross rails 902 and upper center sleeve rails 904 are typically coupled to the tops of the standing twin vertical mount track columns 962. Not show in FIG. 10, but the second embodiment quad mount track matrix 960 may also have a set of four lateral rails 906 that connect adjacent standing twin vertical mount track column 962 to each other, just as in the first embodiment quad mount track matrix 900.

The second embodiment quad mount track matrix 960 shown in FIG. 10 has two floating twin vertical mount track columns 844, one clamped to the cross rails 902 and the other clamped to the center sleeve rails 904. Each floating twin vertical mount track column 844 comprises two channels coupled with bolts 964 passing through bolt holes in the backs of the channels. In the second embodiment quad mount track matrix 960, the bolts 964 pass through bolt holes in the rails 902, 904. In alternative embodiments, the bolts 964 pass under and/or over the rails 902, 904 and when tightened, the bolts 964 pinch the channels against the rails 902, 904.

Figure 11:
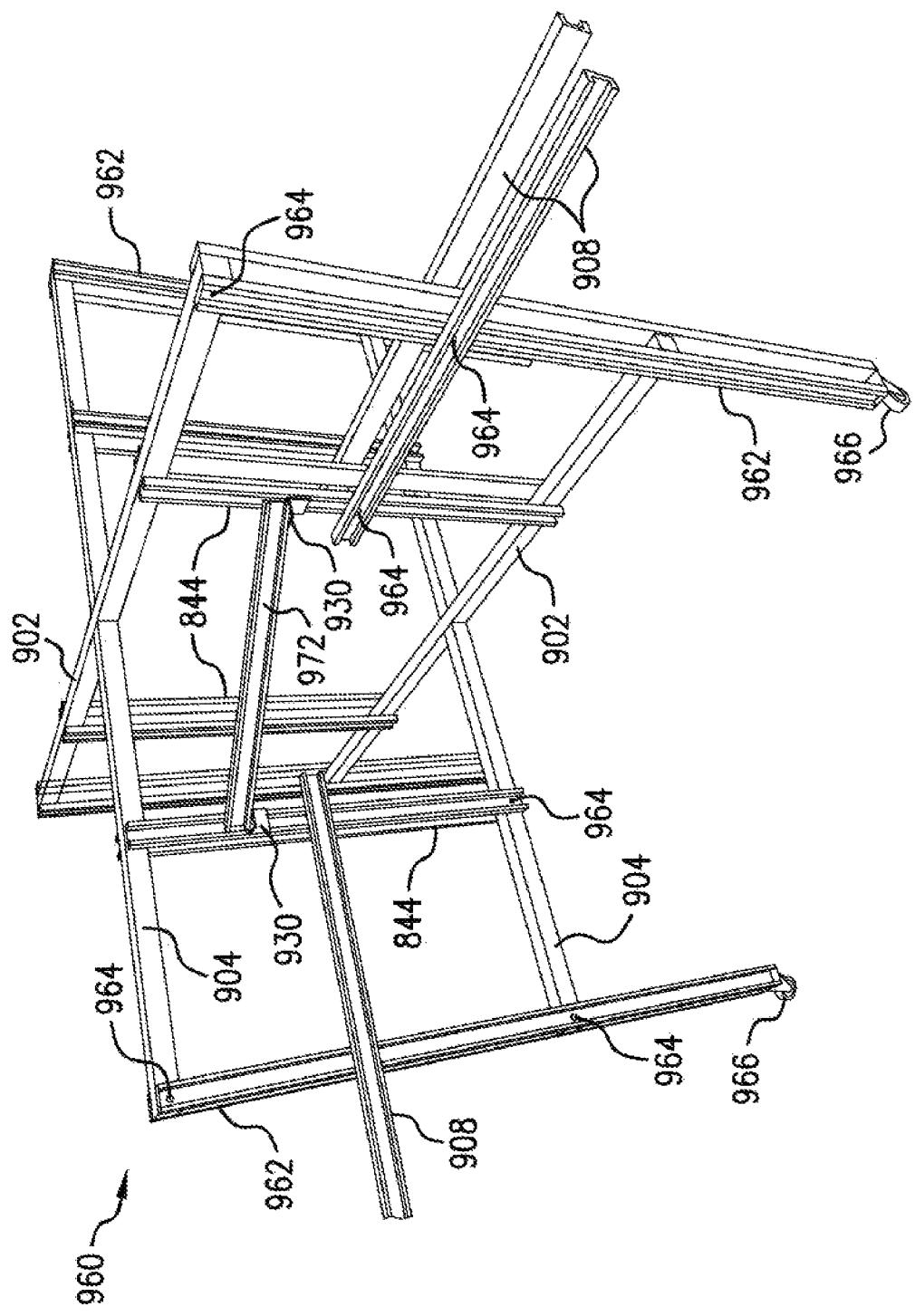
FIG. 11 shows the second representative embodiment of a quad mount track matrix with horizontal mount tracks.

FIG. 11 shows the second representative embodiment of a quad mount track matrix 960 with horizontal mount tracks 908. Two horizontal mount tracks 908, are each coupled to one of the floating twin vertical mount track columns 844 and standing twin vertical mount track column 962 with bolts 964 in the respective channels. A single horizontal mount track 908 is coupled to a different one of the floating twin vertical mount track columns 844 and a different one of the standing twin vertical mount track column 962. The floating twin vertical mount track column 844 and the horizontal mount tracks 908 provide locations to attach accessories (typically with strut nuts) in the interior of the quad mount track matrix 900. For example, two L brackets 930 are coupled to two of the floating twin vertical mount track columns 844 with strut nuts.

Figure 12:
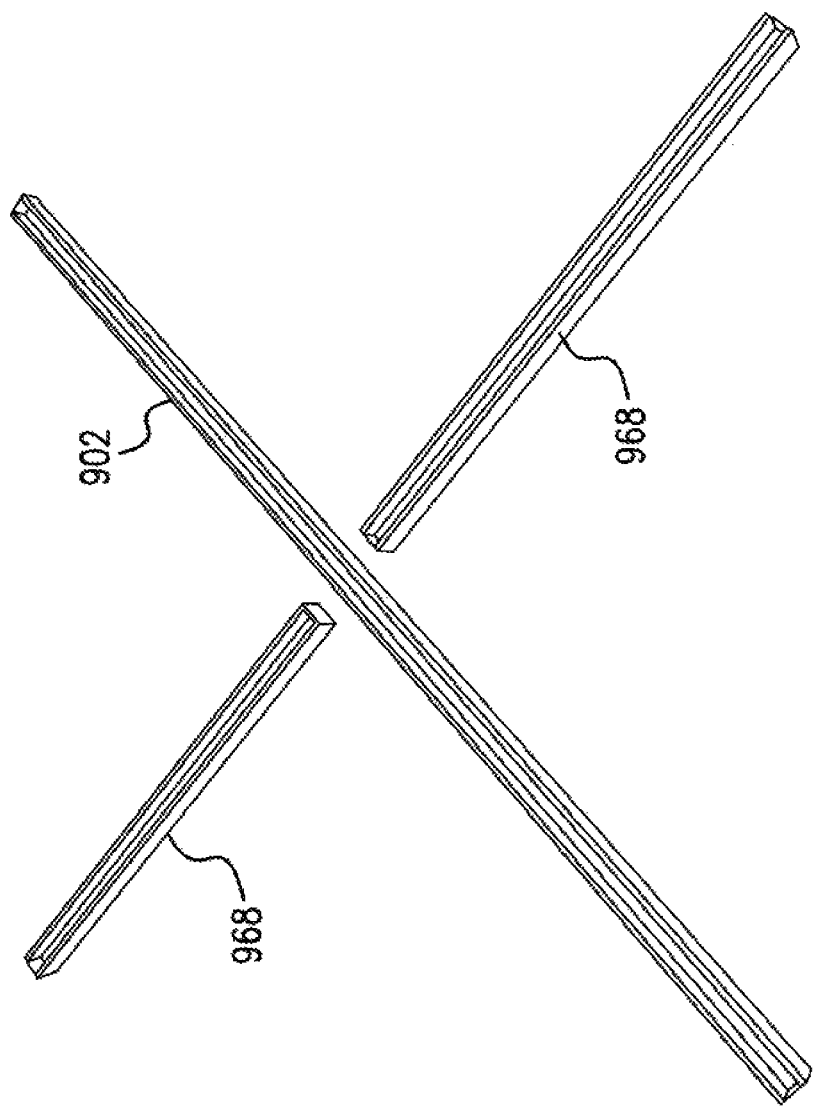
FIG. 12 shows cross rail and two stub rail alternative for the quad mount track matrix.

In alternative embodiments of the first or second embodiment quad mount track matrix 900, 960, the center sleeve rail 904 is replaced with two stub rails 968 as shown in FIG. 12. The stub rails 968 each have an end plate with a bolt hole therein and couple to the center of the cross rail 902 with bolts. In this embodiment of FIG. 12, the cross rail 902 and the stub rails 968 are upward facing strut channels.

Quad Slot Mount Platform

Figure 18:
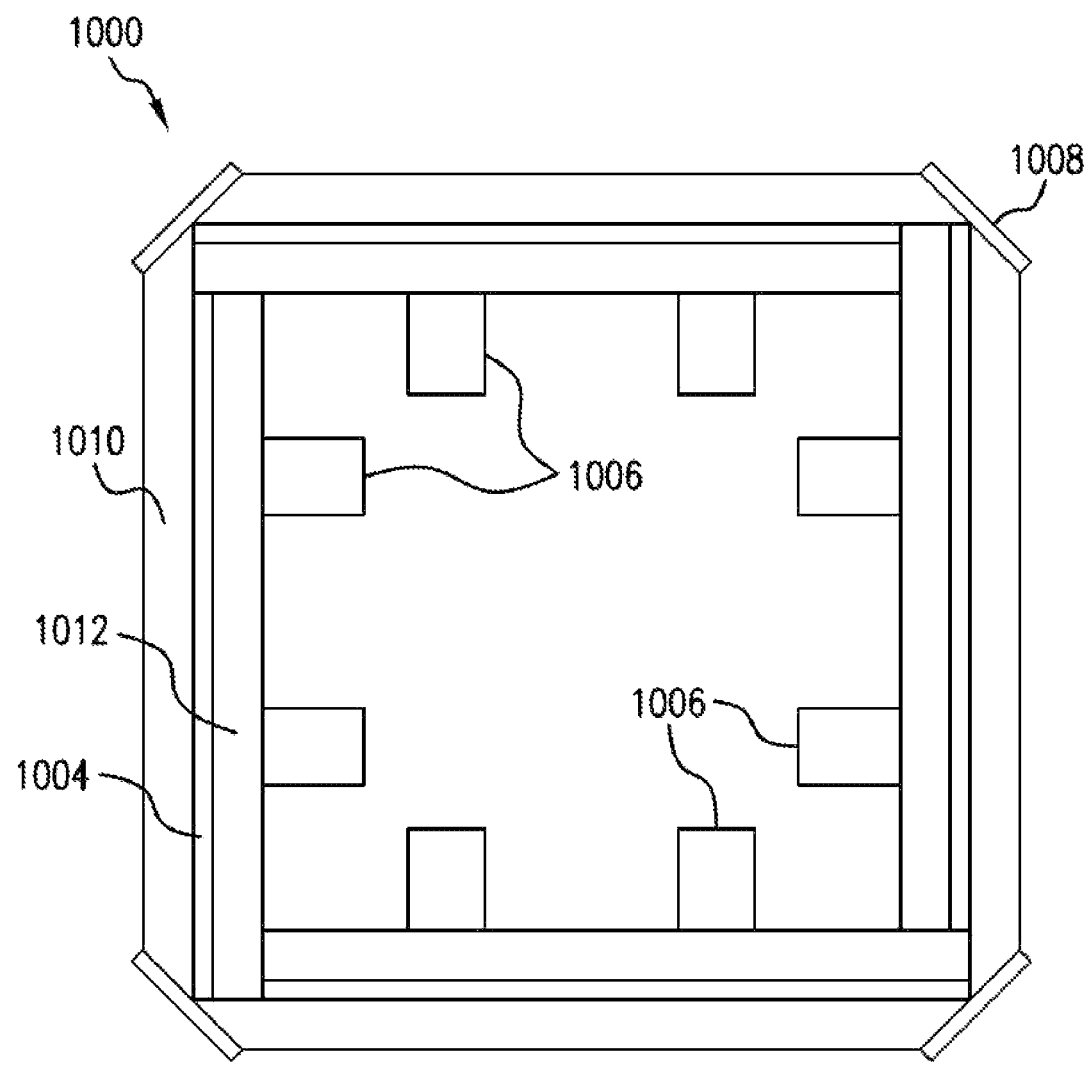
FIG. 18 shows a representative embodiment of a quad slot mount platform.

FIG. 18 shows a representative embodiment of a quad slot mount platform 1000. The quad slot mount platform 1000 comprises four outer rails 1010, four inner rails 1012, and four corner plates 1008. The four outer rails 1010 are arranged in a rectangle. Each outer rail 1010 has two ends, each end coupled to a different one of the four corner plates 1008. The ends of each outer rail 1010 is cut at a 45 degree angle. Each of the four corner plates 1008 is at a 45 degree angle to a long axis of the outer rails 1010 coupled to it. The corner plates 1008 each have two treaded holes. The four inner rails 1012 are arranged inside the four outer rails 1010, each of the inner rails 1012 having a first end coupled to one of the outer rails 1010 and a second end coupled to another one of the inner rails 1012, with a mount slot 1004 between each of the inner rails 1012 and an adjacent one of the outer rails 1010. The quad slot mount platform 1000 further comprises a plurality of platform tabs 1006, each coupled to one of the inner rails 1012, extending into a space between the inner rails 1012. The platform tabs 1006 are positioned and configured to support a shelf 1020, the shelf 1020 configured to fit more or less into the space between the inner rails 1012.

In the representative embodiment quad slot mount platform 1000, each of the outer rails 1010 are equal length to each other and each of the inner rails 1012 are equal length to each other, so that the quad slot mount platform 1000 is in the shape of a square (with beveled corners due to the angle cut ends of the outer rails 1010). In alternative embodiments, two of the outer rails 1010 may be of a first length and two of a second length, such that the quad slot mount platform 1000 is in the shape of a rectangle. In such embodiments, two of the inner rails 1012 are of a first length and two of a second length.

The representative embodiment quad slot mount platform 1000 has dimensions of 36 inches by 36 inches, but may have other dimensions in other embodiments. The mount slot 1004 is typically $13/32$ inches wide, but may have other widths in other embodiments. The rails 1010, 1012 are 1 inch steel tubes, but may be channels or other suitable cross-sectional shapes and may have different dimensions. The outer rails 1010 are coupled to the corner plates 1008 by welding. The inner rails 1012 are also coupled to each other and to the outer rails 1010 with welding. The welded steel tube construction makes the quad slot mount platform 1000 strong and stable.

Quad Slot Mount Matrix

Figure 19:
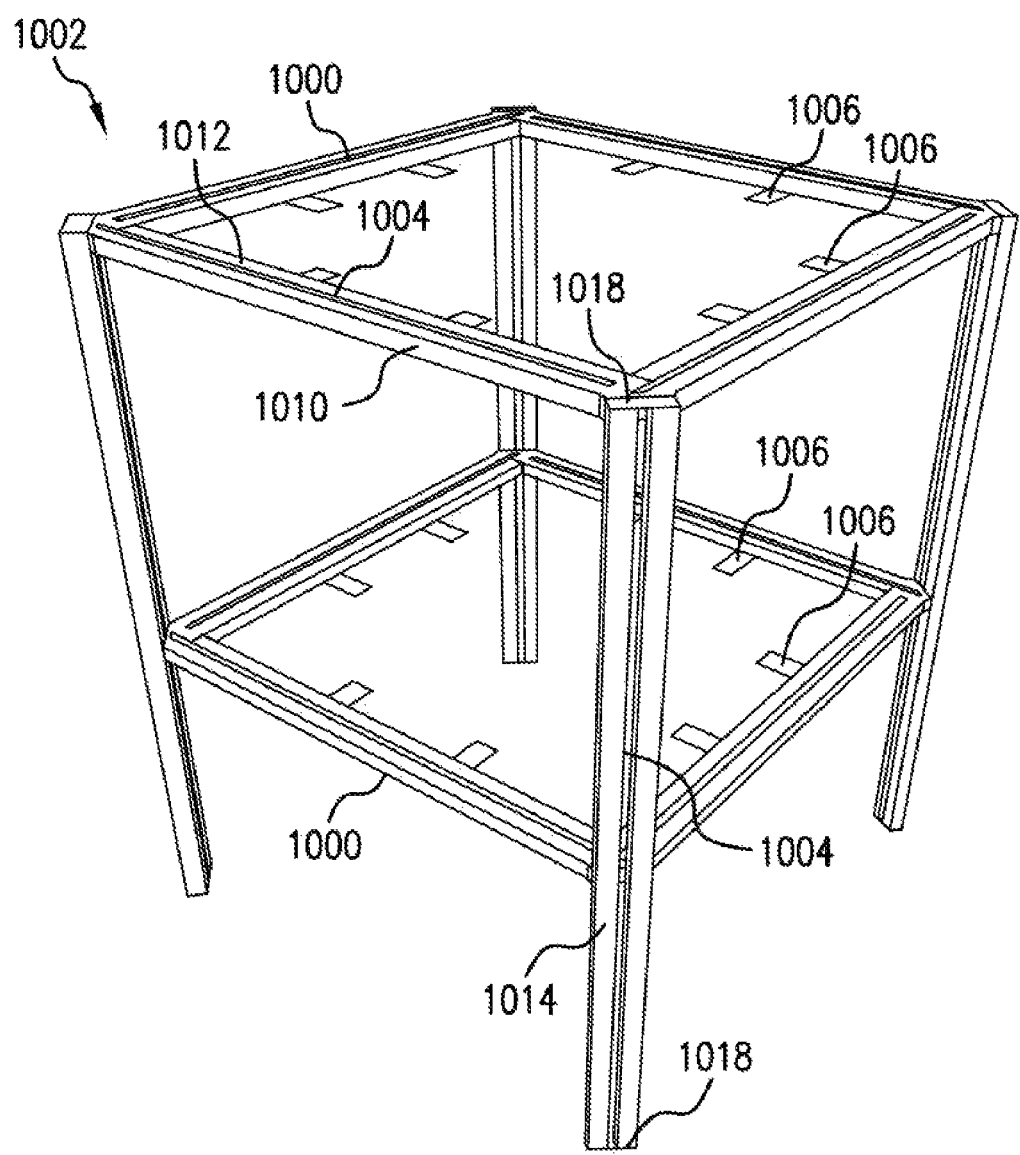
FIG. 19 shows a representative embodiment of a quad slot mount matrix.

FIG. 19 shows a representative embodiment of a quad slot mount matrix 1002. The quad slot mount matrix 1002 comprises two quad slot mount platforms 1000, and four corner double rail slot columns 1014. The corner double rail slot columns 1014 each comprise two rails separated by a mount slot 1004 and coupled by two end plates 1018, typically by welding, one at each end of the corner double rail slot column 1014. The end plates 1018 shown in FIG. 19 do not have threaded holes, but in alternative embodiments they do. The corner double rail slot columns 1014 each have four bolt holes, typically unthreaded, one near the top of each of the two rails, and one near the middle of each of the two rails. The bolt holes are configured to allow threaded fasteners to pass through and engage with the threaded holes in the corner plates 1008.

Figure 20:
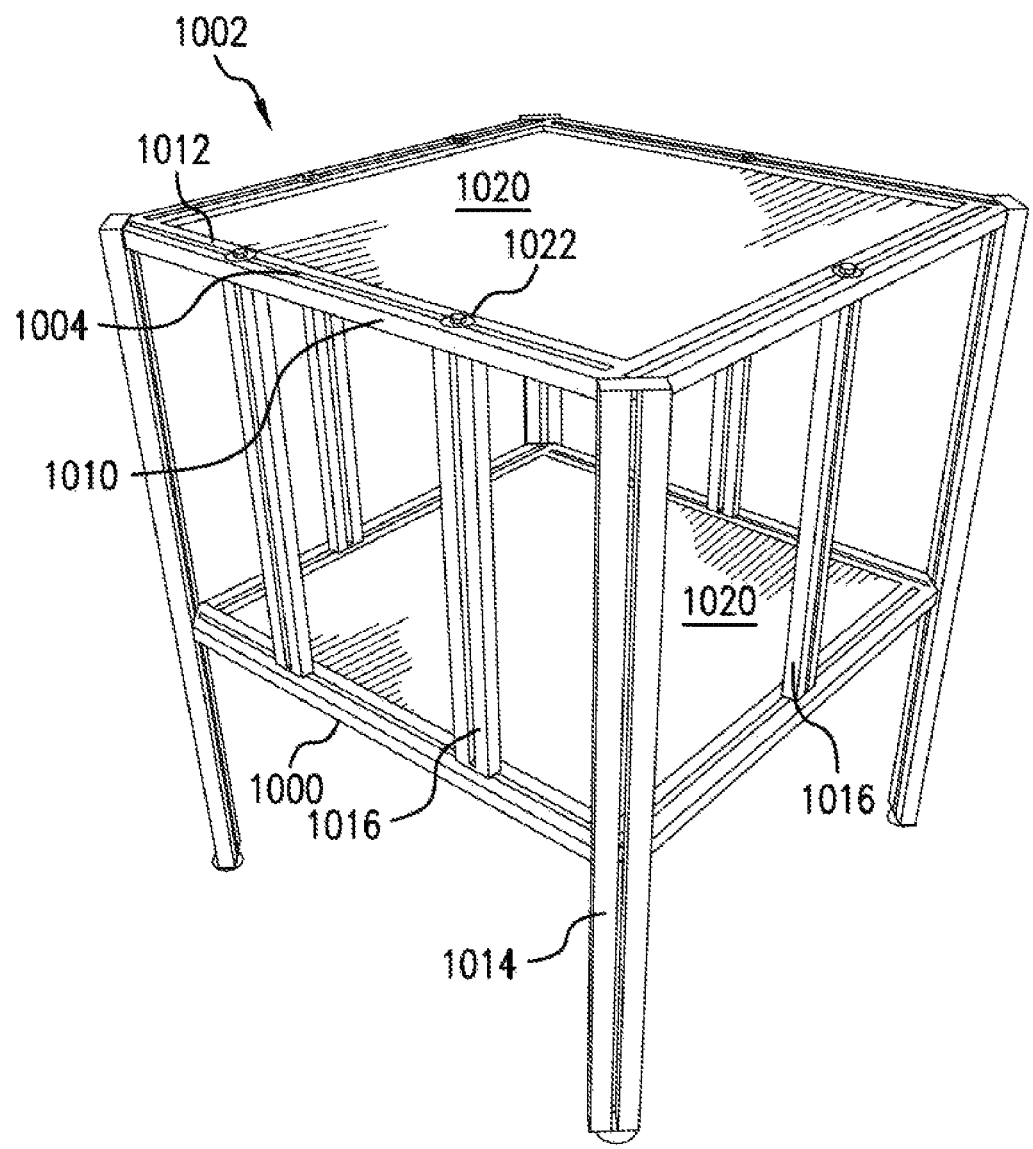
FIG. 20 shows a representative embodiment of a quad slot mount matrix with shelves and intermediate double rail slot columns.

FIG. 20 shows a representative embodiment of a quad slot mount matrix 1002 with shelves 1020 and intermediate double rail slot columns 1016. The shelf 1020 are configured to fit in the space between the inner rails 1012 of the quad slot mount platform 1000 and supported by the platform tabs 1006. Each of the shelves 1020 may be held in place by gravity, or by screws through the platform tabs 1006 and into the shelf 1020. The shelves 1020 are typically made of wood, but may be metal or any other suitable material.

The intermediate double rail slot column 1016 are identical to the corner double rail slot column 1014, but typically shorter, with both holes in the end plates, but no bolt holes in the rails. The intermediate double rail slot columns 1016 are positioned between the mount slots 1004 of the upper quad slot mount platform 1000 and the mount slots 1004 of the lower quad slot mount platform 1000. For each intermediate double rail slot column 1016, a first threaded bolt 1022 passes through the mount slot 1004 of the upper quad slot mount platform 1000 and engages with the threaded hole in one of the end plates of the intermediate double rail slot column 1016. A second threaded bolt 1022 passes through the mount slot 1004 of the lower quad slot mount platform 1000 and engages with the threaded hole in the other end plate of the intermediate double rail slot column 1016. The intermediate double rail slot column 1016 can be oriented with the mount slot 1004 facing outward as shown in FIG. 19 or rotated so that the mount slot 1004 faces one of the corner double rail slot columns 1014, or some angle in between. The intermediate double rail slot column 1016 can be slid sideways following the mount slots 1004. When the correct position and orientation has been achieved, the threaded bolts 1022 can be tightened to hold the intermediate double rail slot column 1016 in place.

Figure 21:
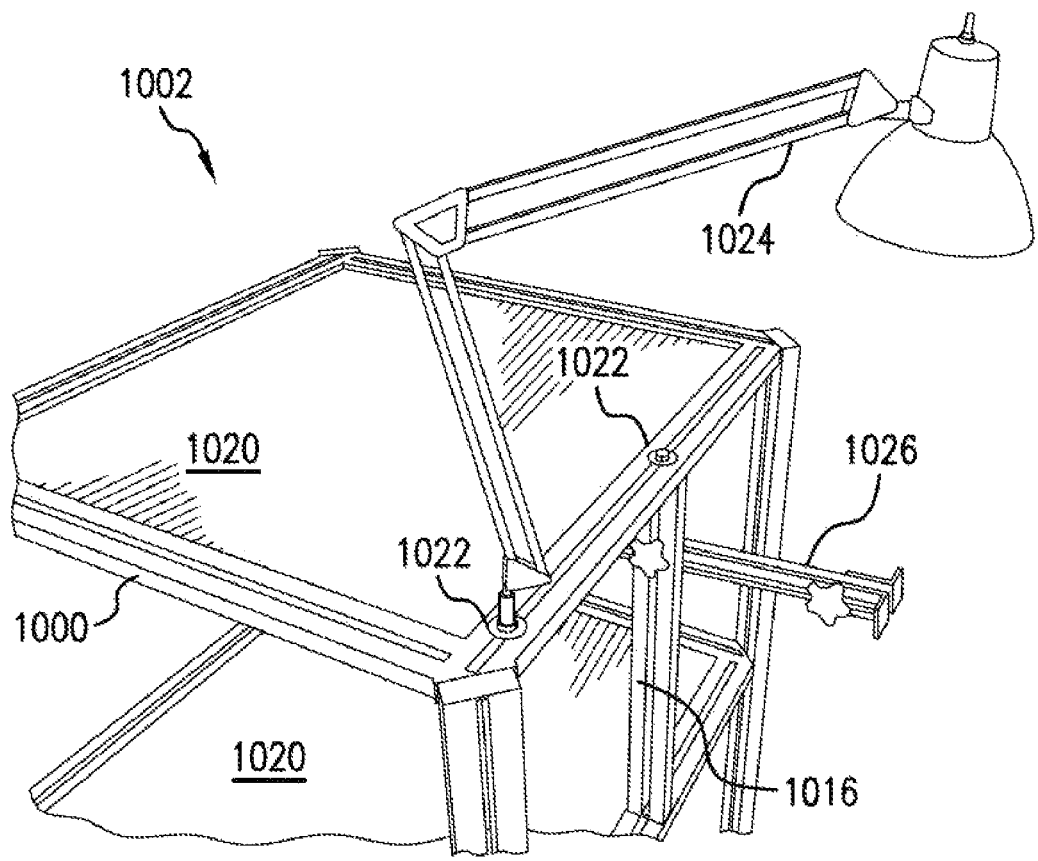
FIG. 21 shows a representative embodiment of a quad slot mount matrix with accessories mounted.

FIG. 21 shows a representative embodiment of a quad slot mount matrix 1002 with an accessory lamp 1026 and an accessory arm 1026. The accessory lamp 1024 is mounted with a threaded bolt 1022 passing through the mount slot 1004 in the quad slot mount platform 1000. The accessory lamp 1024 can be slid sideways following the mount slot 1004. When the correct position and orientation has been achieved, the threaded bolt 1022 can be tightened to hold the accessory lamp 1024 in place. The accessory arm 1026 is a channel with a channel nut therein. The accessory arm 1026 is coupled to the intermediate double rail slot column 1016 with a threaded knob that passes through the mount slot 1004 in the intermediate double rail slot column 1016 and engages with the channel nut in the accessory arm 1026. The accessory arm 1026 can be extended from the intermediate double rail slot column 1016 and retracted, moved up and down the intermediate double rail slot column 1016, and angled upwards or downwards. Once the accessory arm 1026 is at the desired height on the intermediate double rail slot column 1016, extended the desired distance and at the desired orientation, the threaded knob can be tightened so that the accessory arm 1026 is held in place.

Tri Slot Mount Platform

Figure 22:
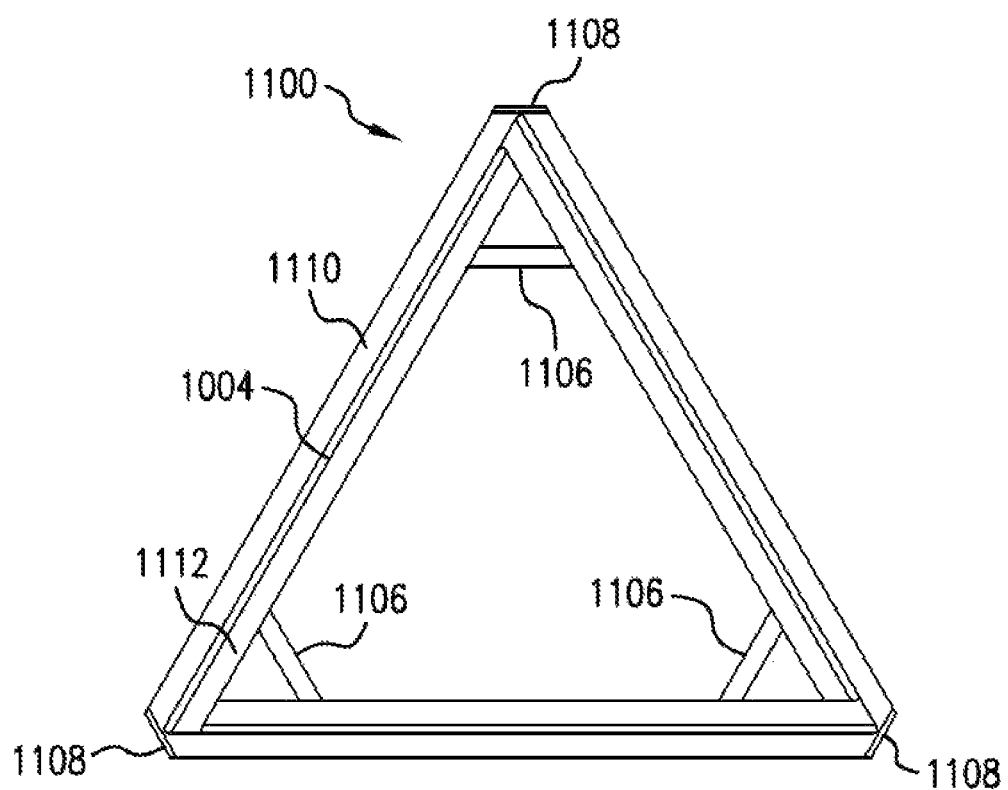
FIG. 22 shows a top view of a representative embodiment of a tri slot mount platform.

FIG. 22-A shows a representative embodiment of a tri slot mount platform 1100. The tri slot mount platform 1100 comprises three outer rails 1110, three inner rails 1112, and three corner plate 1108. The three outer rails 1110 are arranged in a triangle. Each outer rail 1110 has two ends, each end coupled to a different one of the three corner plates 1108. The ends of each outer rail 1110 is cut at a 60 degree angle. Each of the four corner plates 1108 is at a 60 degree angle to a long axis of the outer rails 1110 coupled to it. The corner plates 1108 each have two treaded holes. The three inner rails 1112 are arranged inside the three outer rails 1110, each of the inner rails 1112 having a first end coupled to one of the outer rails 1110 and a second end coupled to another one of the inner rails 1112, with a mount slot 1004 between each of the inner rails 1112 and an adjacent one of the outer rails 1110. The tri slot mount platform 1100 further comprises a plurality of platform tab 1106, each coupled to one of the inner rails 1112, extending into a space between the inner rails 1112. In the representative embodiment, each of the platform tabs 1106 is coupled to two of the inner rails 1112, but in other embodiments one or more of the platform tabs 1106 is coupled only to a single inner rail 1112. The platform tabs 1106 are positioned and configured to support a shelf 1120, the shelf 1120 configured to fit more or less into the space between the inner rails 1112.

In the representative tri slot mount platform 1100, each of the outer rails 1110 are equal length to each other and each of the inner rails 1112 are equal length to each other, so that the tri slot mount platform 1100 is in the shape of an equilateral triangle (with beveled corners due to the angle cut ends of the outer rails 1110). In alternative embodiments, one or more of the outer rails 1110 may be of a different length than the others. In such embodiments, one or more of the inner rails 1112 are of different lengths than the others as well.

The representative embodiment tri slot mount platform 1100 has dimensions of 36 inches by 36 inches by 36 inches, but may have other dimensions in other embodiments. The mount slot 1004 is typically 13/32 inches wide, but may have other widths in other embodiments. The rails 1110, 1112 are 1 inch steel tubes, but may be channels or other suitable cross-sectional shapes and may have different dimensions.

The outer rails 1110 are coupled to the corner plates 1108 by welding. The inner rails 1112 are also coupled to each other and to the outer rails 1110 with welding. The welded steel tube construction makes the tri slot mount platform 1100 strong and stable.

Tri Slot Mount Matrix

Figure 23A:
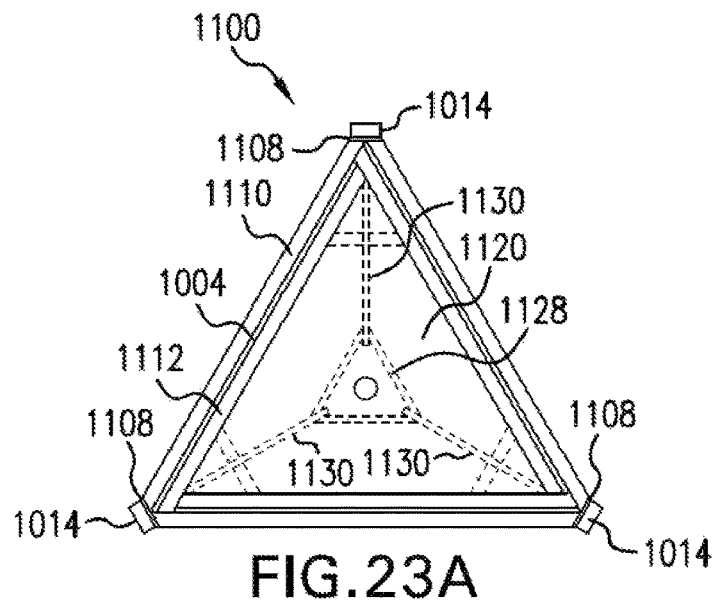
FIG. 23A shows a top view of a representative embodiment of a tri slot mount matrix.
Figure 23B:
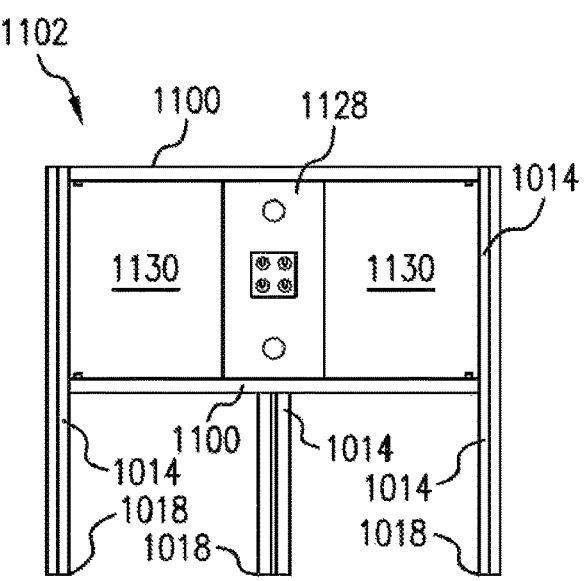
FIG. 23B shows a side view of a representative embodiment of the tri slot mount matrix.
Figure 23C:
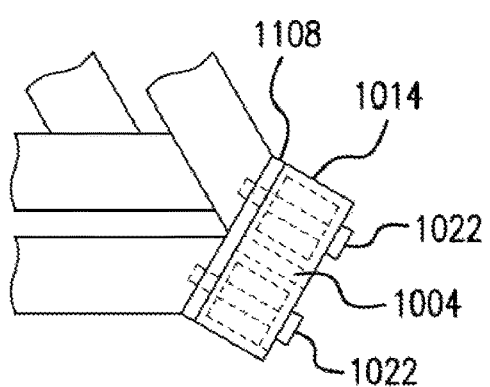
FIG. 23C shows a detailed view of the a corner of the tri slot mount matrix.

FIGS. 23A and 23B show a representative embodiment of a tri slot mount matrix 1102 with shelves 1120, a triangular power tower 1128 and three divider panels. The tri slot mount matrix 1102 comprises two tri slot mount platforms 1100, and three corner double rail slot columns 1014. The corner double rail slot columns 1014 are the same as in the quad slot mount matrix 1002. The corner double rail slot columns 1014 each have four bolt holes, typically unthreaded, one near the top of each of the two rails, and one near the middle of each of the two rails. The bolt holes are configured to allow threaded fasteners to pass through and engage with the threaded holes in the corner plate 1108 (See FIG. 23C).

The shelves 1120 are configured to fit in the space between the inner rails 1012 of the tri slot mount platform 1100 and supported by the platform tabs 1106. Each of the shelves 1120 may be held in place by gravity, or by screws through the platform tabs 1106 and into the shelf 1120. The shelves 1120 are typically made of wood, but may be metal or any other suitable material. The triangular power tower 1128 is positioned in the middle of the tri slot mount matrix 1102 between the upper tri slot mount platform 1100 and the lower tri slot mount platform 1100. Each of the divider panels 1130 is positioned between the upper tri slot mount platform 1100 and the lower tri slot mount platform 1100, from one of the corner double rail slot columns 1014 to the closest corner of the triangular power tower 1128.

The intermediate double rail slot columns 1016 of the quad slot mount matrix 1002 may be used in a similar manner with the tri slot mount matrix 1102, positioned between the mount slots 1004 of the upper tri slot mount platform 1100 and the mount slots 1004 of the lower tri slot mount platform 1100.

Hex Slot Mount Matrix

Figure 24B:
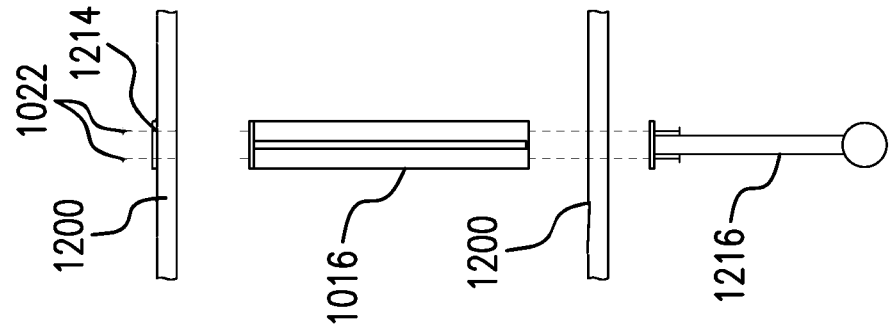
FIG. 24B shows a side view of supports for the hex slot mount platform
Figure 24A:
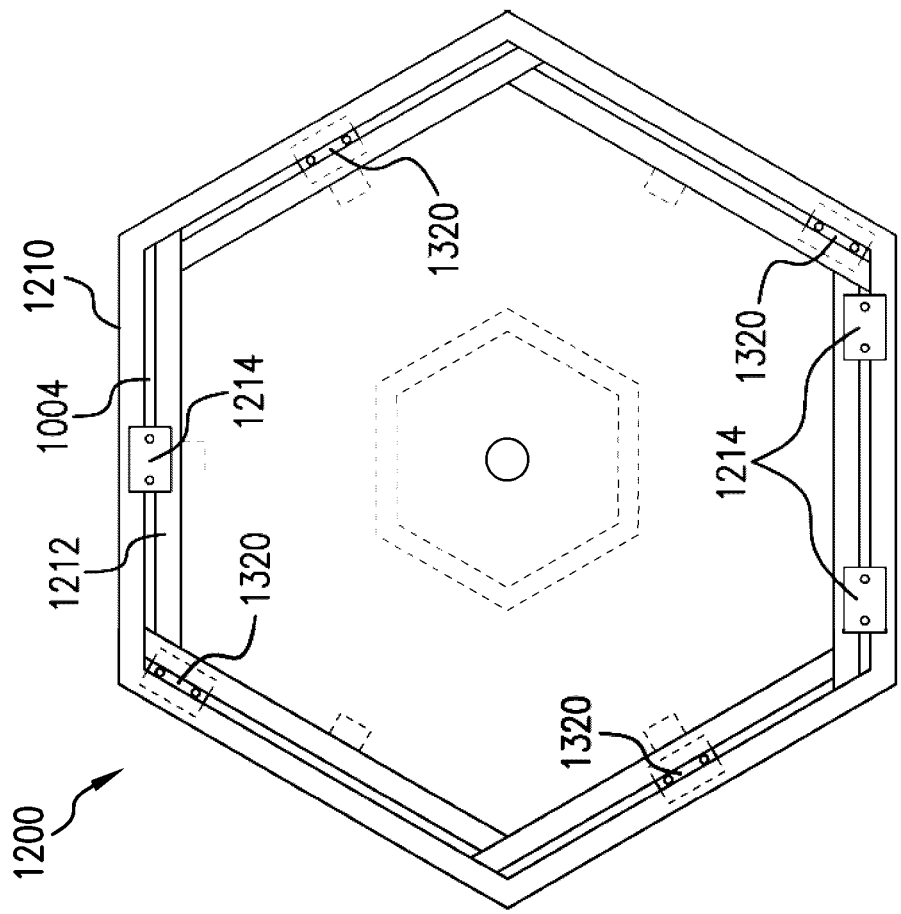
FIG. 24A shows a top view of a representative embodiment of a hex slot mount platform.

FIGS. 24A and 24B show a representative embodiment of a hex slot mount platform 1200. The hex slot mount platform 1200 is the same as the quad slot mount platform 1000 and the tri slot mount platform 1100 except as noted herein. The hex slot mount platform 1200 comprises six outer rails 1210 and six inner rails 1212. The six outer rails 1210 are arranged in a hexagon. Each outer rail 1210 has two ends, each end coupled to a different one of the outer rails 1210. The ends of each outer rail 1210 is cut at a 30 degree angle. The hex slot mount platform 1200 does not have end plates. The six inner rails 1212 are arranged inside the six outer rails 1210, each of the inner rails 1212 having a first end coupled to one of the outer rails 1210 and a second end coupled to another one of the inner rails 1212, with a mount slot 1004 between each of the inner rails 1212 and an adjacent one of the outer rails 1210.

The hex slot mount platform 1200 is not supported by corner double rail slot columns 1014. Instead, a first set of intermediate double rail slot columns 1016 is used to support a lower hex slot mount platform 1200 from the floor and a second set is used to support an upper hex slot mount platform 1200 from the lower hex slot mount platform 1200. One or more of the intermediate double rail slot columns 1016 is coupled to the hex slot mount platform 1200 with bolts 1022 that pass through a mount plate 1214 on the other side of the hex slot mount platform 1200 and engage with the end plate 1018 of the intermediate double rail slot columns 1016. See FIG. 24B. In some embodiments, one or more of the intermediate double rail slot columns 1016 supporting the lower hex slot mount platform 1200 are replaced one or more legs 1216. The legs 1216 couple either to threaded backer plates 1320 (see FIG. 24A) or to end plates 1018 of the intermediate double rail slot columns 1016 (see FIG. 24B).

An N-sided slot mount platform may be made similar to the hex slot mount platform 1200. The N-sided slot mount platform comprises N outer rails and N inner rails. The N outer rails are arranged in a N-side polygon. Each outer rail has two ends, each end coupled to a different one of the outer rails. The ends of each outer rail is cut at a 0.3/N degree angle. The N inner rails are arranged inside the N outer rails, each of the inner rails having a first end coupled to one of the outer rails and a second end coupled to another one of the inner rails, with a mount slot between each of the inner rails and an adjacent one of the outer rails. The N-sided slot mount platform may be supported with intermediate double rail slot columns 1016 in a similar manner as the hex slot mount platform 1200.

Uni Slot Mount Platform

Figure 25:
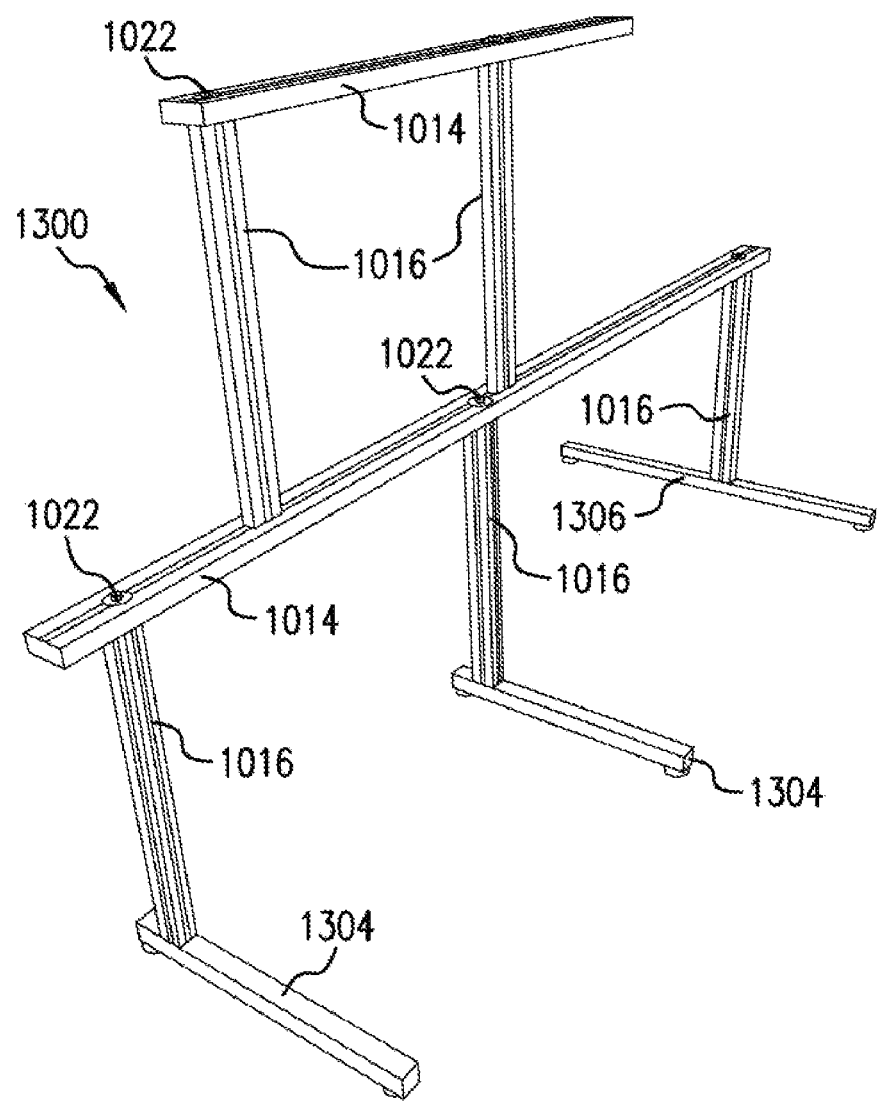
FIG. 25 shows a representative embodiment of a uni-slot mount platform.

FIG. 25 shows a representative embodiment of a uni-slot mount platform 1300. The uni slot mount platform 1300 comprises a corner double rail slot column 1014 supported in a horizontal position by a plurality of intermediate double rail slot columns 1016, coupled in the usual manner with a threaded bolt 1022 that engages the end plate 1018 of the intermediate double rail slot column 1016. Multiple layers of corner double rail slot column 1014 can be stacked in this manner. The intermediate double rail slot column 1016 are stabilized on the floor with cantilever legs 1304 or balanced legs 1306. Accessories can be attached to the horizontal corner double rail slot columns 1014 and the vertical intermediate double rail slot columns 1016 in a similar manner as in the previous platform embodiments.

Arms and Positioning Holders

The Universal Mount Platform includes positioning holders for holding workstation accessories such as tabletops, lighting fixtures, cabinets, tool holders, computer monitors, etc. Positioning holders for use with the Universal Mount Platform are configured for attaching to rails (e.g. cross rails 902), channels (e.g. horizontal mount track 908), columns (e.g. standing triple vertical mount track column 884) or other components of a workstation module (e.g. the quad mount track matrix 900). The positioning holders typically are configured to allow repositioning of the accessory and in some cases, of the positioning holder itself. Objects are attached by bolting, pinning, clamping, telescoping, clipping (plastics), wedging or nesting.

Figure 14A:
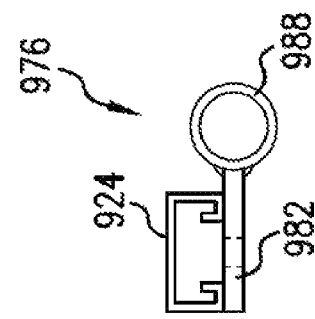
FIGS. 14A and 14B show a top and side view respectively of an offset holder.
Figure 14B:
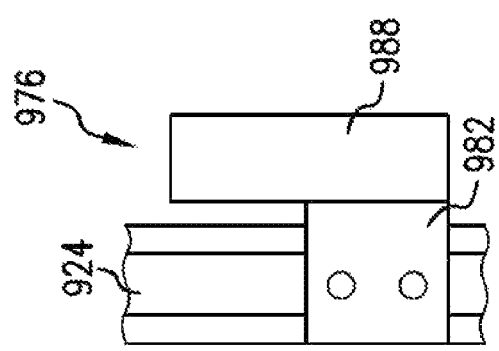

FIGS. 14A and 14B show a top and side view respectively of an offset holder 976. The offset holder 976 comprises an offset mount flange 982 coupled to a holder tube 988. The offset mount flange 982 has bolt holes therein for mounting to a strut channel (such as half-height strut channel rail 924 shown), typically with strut nuts.

Figure 15A:
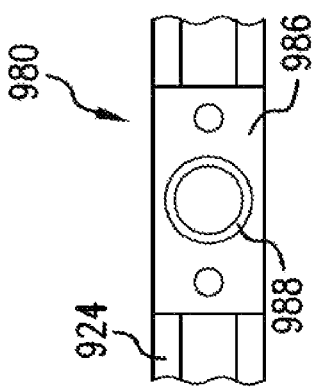
FIGS. 15A and 15B show a top and side view respectively of a centered holder.
Figure 15B:
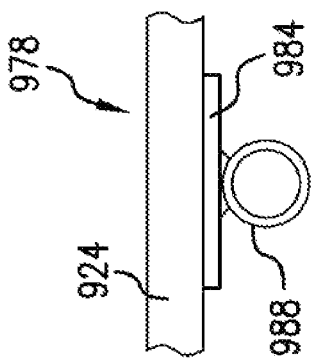

FIGS. 15A and 15B show a top and side view respectively of a centered holder 978. The centered holder 978 comprises a centered mount flange 984 coupled to a holder tube 988. The centered mount flange 984 has bolt holes therein for mounting to a strut channel (such as half-height strut channel rail 924 shown), typically with strut nuts.

Figure 16A:
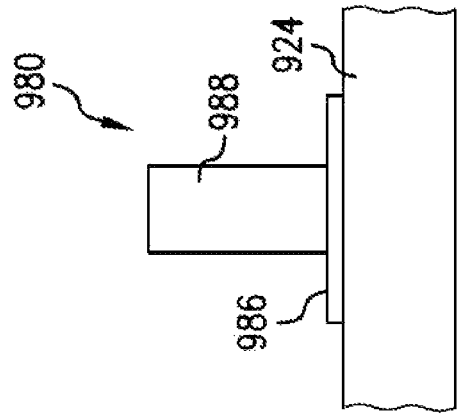
FIGS. 16A and 16B show a top and side view respectively of a vertical holder.
Figure 16B:
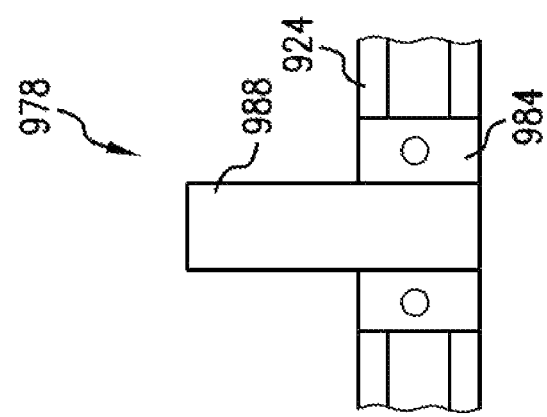

FIGS. 16A and 16B show a top and side view respectively of a vertical holder 980. The vertical holder 980 comprises a vertical mount flange 986 coupled to a holder tube 988. The vertical mount flange 986 has bolt holes therein for mounting to a strut channel (such as half-height strut channel rail 924 shown), typically with strut nuts.

Figure 17A:
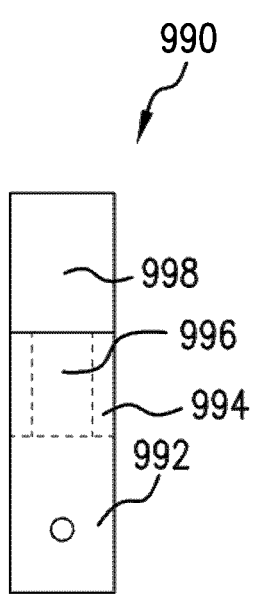
FIG. 17A shows a front view of a swing arm holder.
Figure 17B:
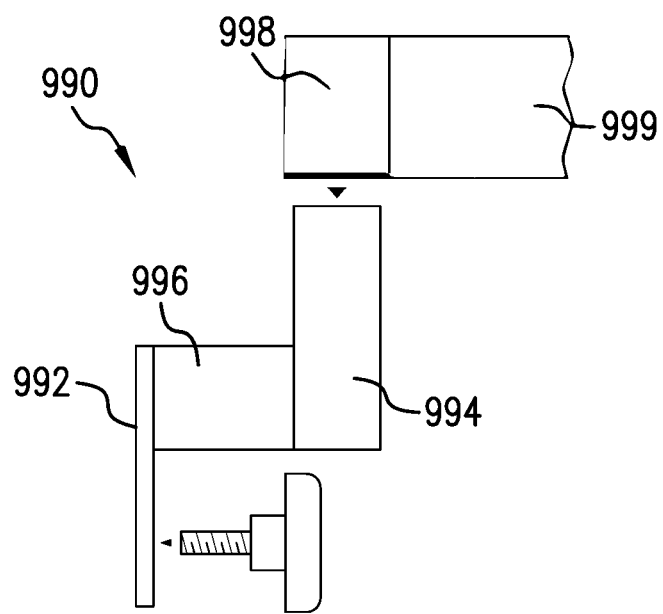
FIG. 17B shows a side view of the swing arm holder and a swing arm.
Figure 17C:
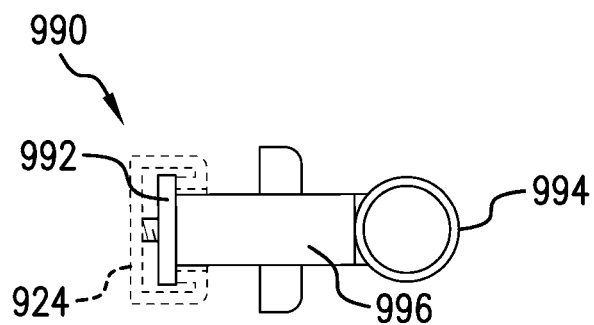
FIG. 17C shows a top view of the swing arm holder.

FIG. 17A shows a front view of a swing arm holder 990. FIG. 17B shows a side view of the swing arm holder 990 and a swing arm 999. FIG. 17C shows a top view of the swing arm holder 990. The swing arm holder 990 comprises at swing arm holder flange 992 coupled to a swing arm holder extension tube 996, which is coupled in turn to a swing arm holder tube 994. The swing arm holder flange 992 has a bolt hole for a knob with a threaded screw to pass through and engage with a strut nut inside a strut channel (such as half-height strut channel rail 924 shown). A swing arm 999 with a swing arm tube 998 slidingly couples with the swing arm holder tube 994, the swing arm tube 998 with a slightly larger inside diameter than the outside diameter of the swing arm holder tube 994.

Figure 26:
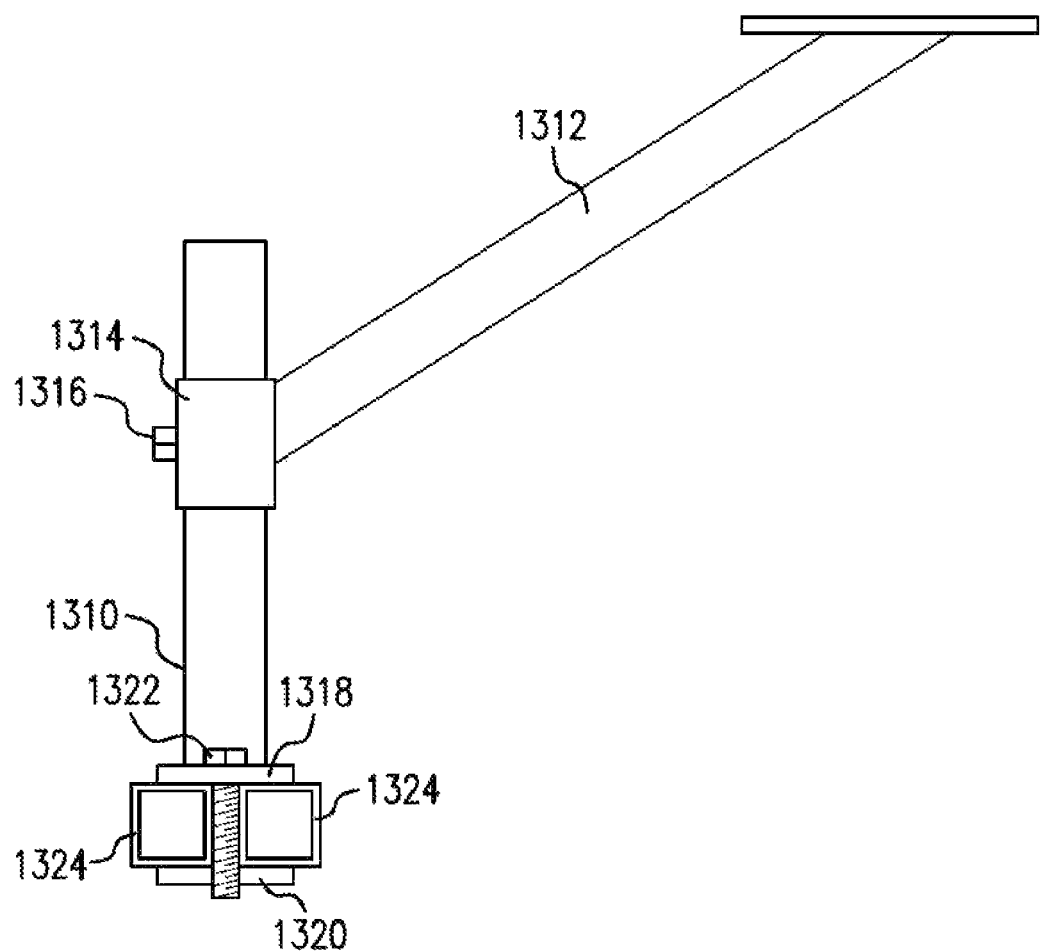
FIG. 26 shows an attachment mechanism comprising an arm coupled to a post with a sleeve and a retaining nut.
Figure 27A:
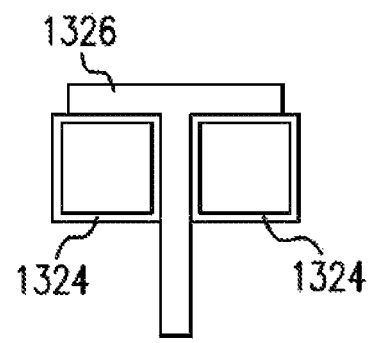
FIGS. 27A, 27B and 27C show a T bracket from the side, front, and top respectively.
Figure 27B:
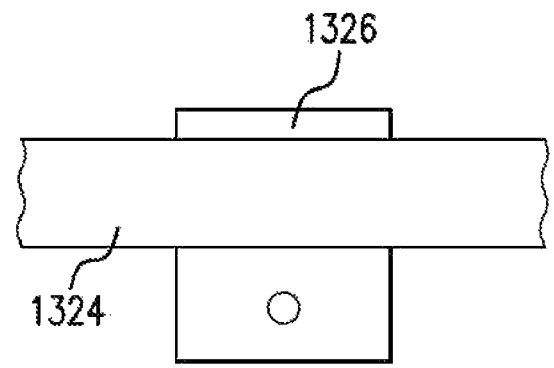
Figure 27C:
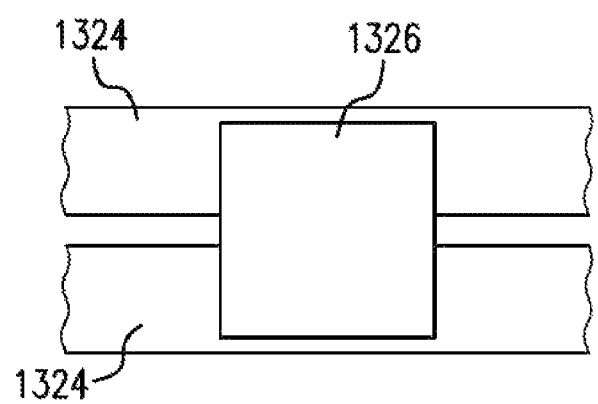
Figure 28A:
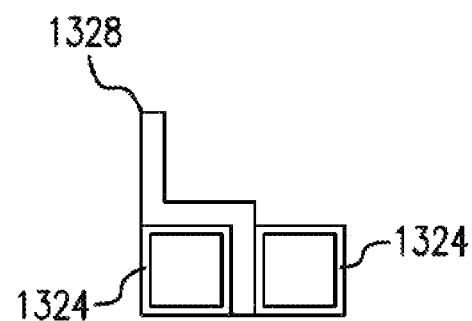
FIGS. 28A, 28B and 28C show a Z bracket from the side, front, and top respectively.
Figure 28B:
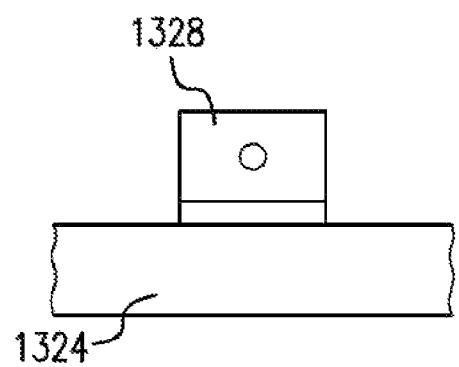
Figure 28C:
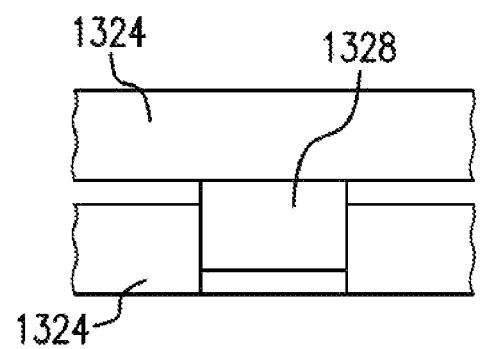
Figure 29:
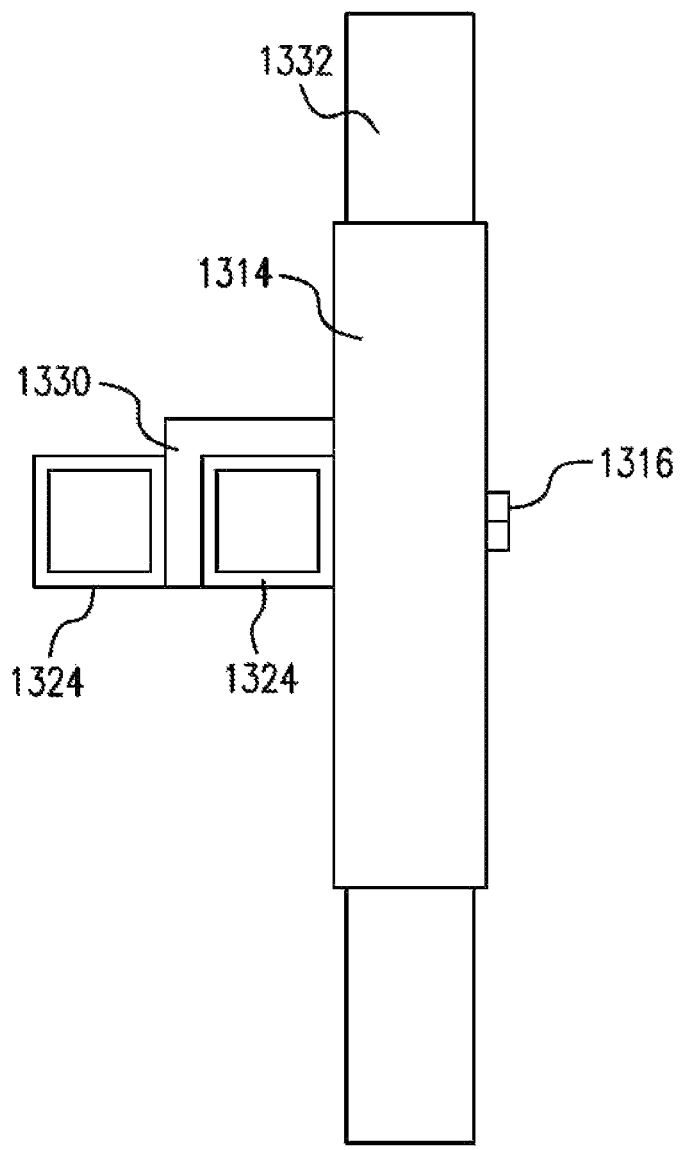
FIG. 29 shows an R bracket coupled to a sleeve and a telescoping tube in the sleeve.

FIGS. 26, 27, 29, and 29 show various types of accessory attachment mechanisms for use with the various platforms of the universal mount platform system. FIG. 26 shows an attachment mechanism comprising an arm 1312 coupled to a post 1310 with a sleeve 1314 and a retaining nut 1316. The post 1310 has a flange 1318 through which one or more fasteners 1322 pass. The fasteners 1322 pass between tube rails 1324 and engage with a backer plate 1320. FIG. 27A shows a T bracket 1326 from the side. FIG. 27B shows the T bracket 1326 from the front. FIG. 27C shows the T bracket 1326 from the top. The fasteners 1322 pass between tube rails 1324 and engage with a backer plate 1320. FIG. 28A shows a Z bracket 1328 from the side. FIG. 28B shows the Z bracket 1328 from the front. FIG. 28C shows the Z bracket 1328 from the top. FIG. 29 shows an R bracket 1330 coupled to a sleeve 1314 with a retaining nut 1316 and a telescoping tube 1332 in the sleeve 1314. FIGS. 30A, 30B, and 30C respectively show a side sectional view, a top view, and a front view of a pair of L brackets 1334 clamped together on a pair of rails 1324. FIGS. 31A, 31B, and 31C respectively show a side sectional view, a top view, and a front view of an L bracket 1334 clamped with a threaded backer plate 1320 on a pair of rails 1324. FIGS. 32A, 32B, and 32C respectively show a side sectional view, a top view, and a front view of a fastener 1322 passing through an unthreaded washer 1338 and engaging a threaded washer 1336 to clamp a pair of rails 1324. FIGS. 33A, 33B, and 33C respectively show a side sectional view, a top view, and a front view of a post 1310 clamped to a threaded backer plate 1320 on the pair of rails 1324.

Workstation Arrangements Based on the Workstation Modules

Figure 7:
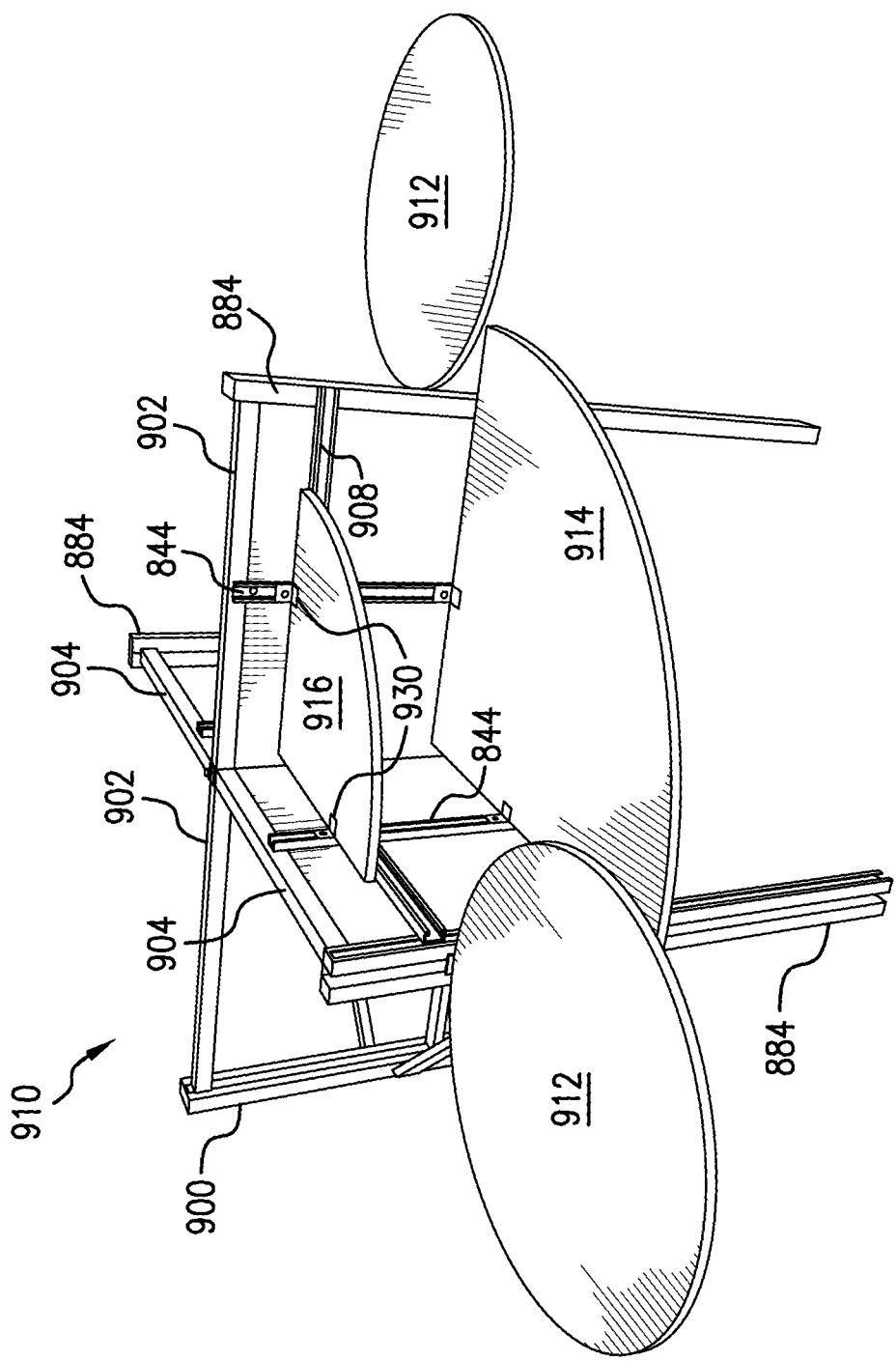
FIG. 7 shows a first embodiment workstation arrangement based on the quad mount track matrix.

FIG. 7 shows a first embodiment workstation arrangement 910. This is a simple application of the quad mount track matrix 900. An upper quadrant tabletop 916 rests on the horizontal mount tracks 908 and is held in place by L brackets 930 coupled to the floating twin vertical mount track columns 844 with bolts and strut nuts. A lower quadrant tabletop 914 rests on one of the lateral rails 906 and is held in place above and below by L brackets 930 coupled to the floating twin vertical mount track columns 844 with bolts and strut nuts. Two circular table tops 912 are shown that are coupled to the respective T support arm 882, typically with screws.

Figure 8:
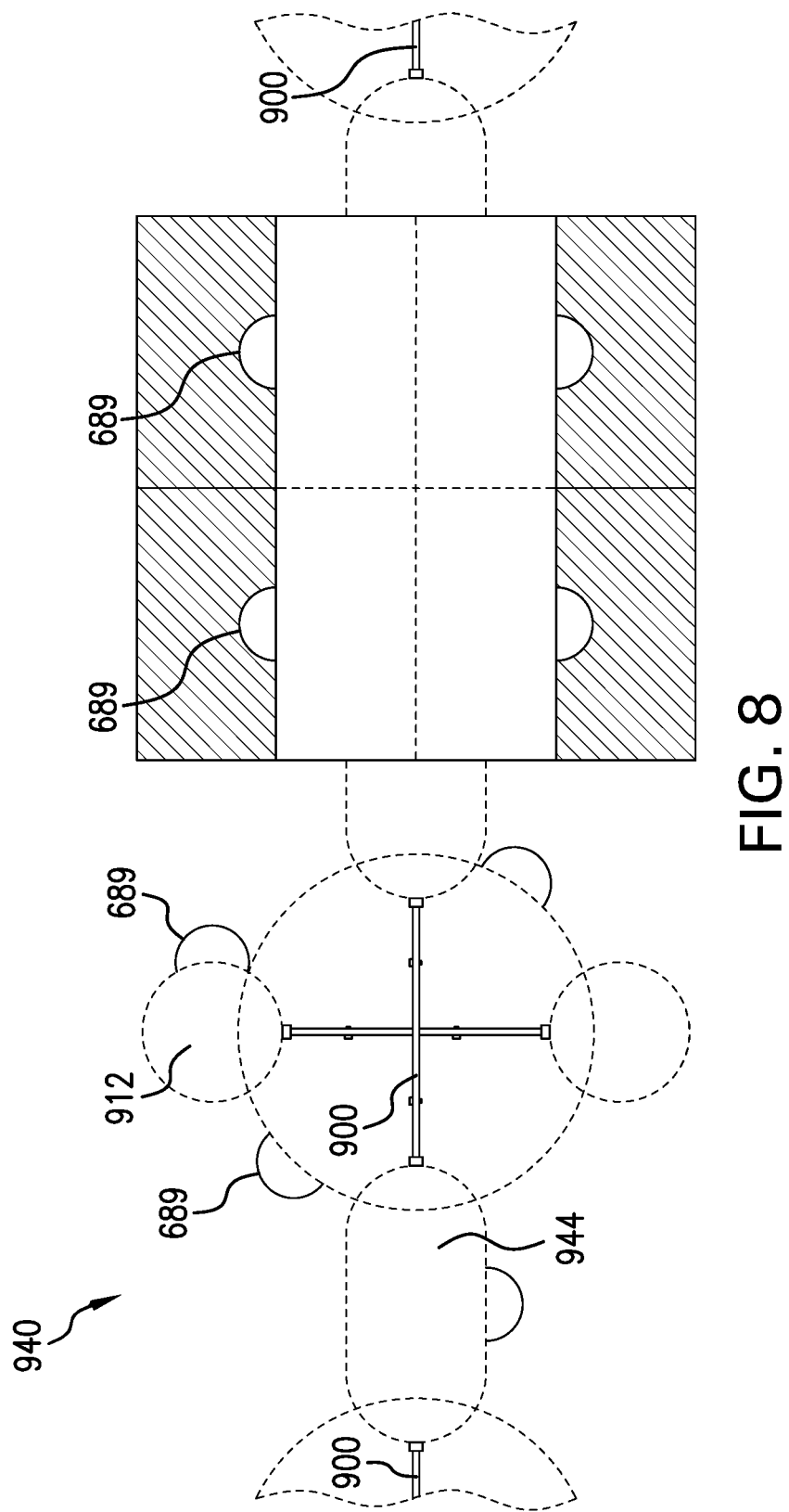
FIG. 8 shows a first embodiment workstation arrangement.
Figure 9:
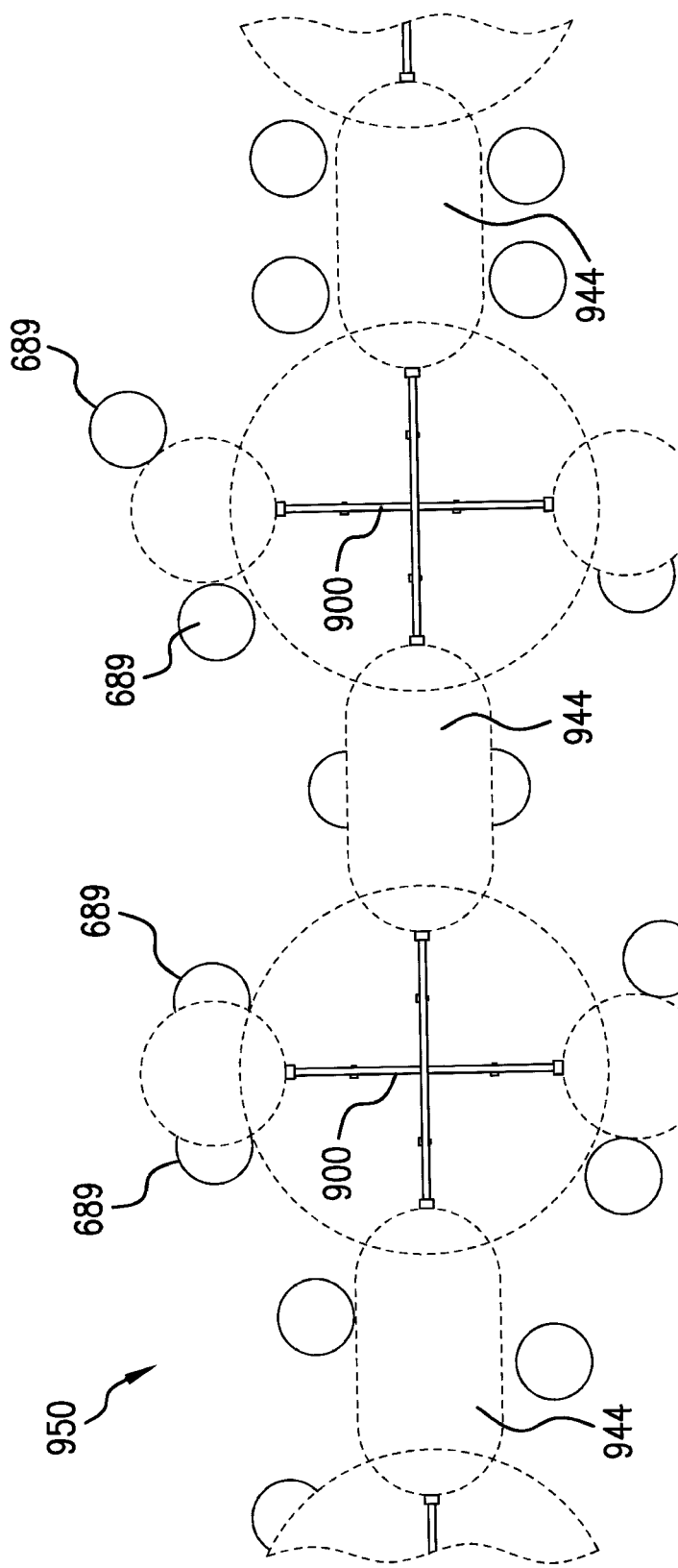
FIG. 9 shows a second embodiment workstation arrangement.

FIG. 8 shows a second embodiment workstation arrangement 940 and FIG. 9 shows a third embodiment workstation arrangement 950. These workstation arrangements 940, 950 are based on chains of mount track matrixes 900. Various accessories such as circular tabletops 912 and cantilevered tabletop 944 are attached thereto and provide multiple workstations (indicated by stools 689).

Figure 13:
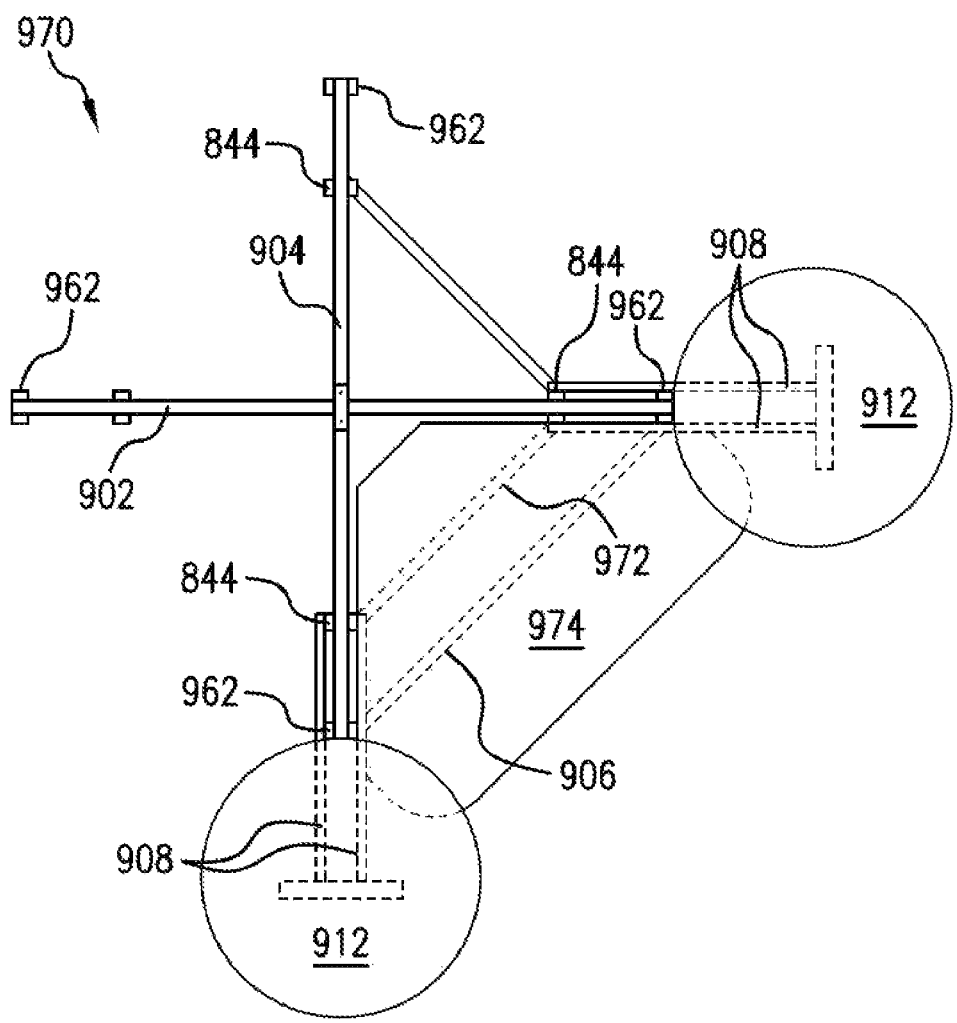
FIG. 13 shows a third embodiment workstation arrangement.

FIG. 13 shows a third embodiment workstation arrangement 970. The third embodiment workstation arrangement 970 is based on the second embodiment quad mount track matrix 960. Various accessories such as circular tabletops 912 and quadrant tabletop 974 are attached thereto and provide multiple workstations. A lateral rail 906 is coupled between two adjacent standing triple vertical mount track columns 884 which supports the quadrant tabletop 974. A diagonal mount track 972 is coupled between two adjacent floating twin vertical mount track columns 844. at the same height as the lateral rail 906 to give additional support to the quadrant tabletop 974.

What is claimed is:

1. An N-side slot mount matrix comprising:
   an N number of outer rails arranged longitudinal end to longitudinal end in a N-sided polygon, where N is an integer, each of the outer rails having two outer rail longitudinal ends, each of the two outer rail longitudinal ends coupled to one of the longitudinal outer rail ends of another one of the outer rails;
   an N number of inner rails, each of the inner rails having a first longitudinal end coupled to one of the outer rails and a second longitudinal end coupled to another one of the inner rails;
   wherein the outer rails and the inner rails are tubes; and
   an N number of mount slots, each between one of the inner rails and an adjacent one of the outer rails.

2. The N-side slot mount matrix of claim 1 wherein:
   each longitudinal end of each outer rail is at a 180/N degree angle to a longitudinal axis of the outer rail.

3. The N-side slot mount matrix of claim 1 wherein:
   a plurality of platform tabs, each coupled to one of the inner rails, extending into a space between the inner rails.

4. An N-side slot mount matrix comprising:
   an N number of outer rails arranged in a N-sided polygon, where N is an integer, each of the outer rails having two outer rail ends, each of the two outer rail ends coupled to one of the outer rail ends of another one of the outer rails;
   an N number of inner rails, each of the inner rails having a first end coupled to one of the outer rails and a second end coupled to another one of the inner rails; and
   an N number of mount slots, each between one of the inner rails and an adjacent one of the outer rail;
   a plurality of double rail slot columns, each positioned under one of the outer rails and one of the inner rails;
   a plurality of mount plates, each positioned over one of the outer rails and one of the inner rails; and
   a plurality of bolts, each, each passing through one of the mount plates, one of the mount slots and engaging with one of the double rail slot columns.

5. The N-side slot mount matrix of claim 1 wherein:
   the outer rails and the inner rails are rectangular tubes.

6. The N-side slot mount matrix of claim 1 wherein:
   the outer rails and the inner rails are square tubes.

7. The N-side slot mount matrix of claim 1 wherein:
   the outer rails and the inner rails are metal tubes.

8. The N-side slot mount matrix of claim 1 wherein:
   the outer rails and the inner rails are square metal tubes.

9. The N-side slot mount matrix of claim 1 wherein:
   where N is an integer greater than two.

10. The N-side slot mount matrix of claim 1 wherein:
    each of the outer rails has a longitudinal axis that intersects a longitudinal axis of an adjacent outer rail.

11. The N-side slot mount matrix of claim 1 wherein:
    each of the outer rails has a longitudinal axis that intersects a longitudinal axis of an adjacent outer rail at an angle of 360/N.

12. An N-side slot mount matrix comprising of:
    an N number of outer rails arranged longitudinal end to longitudinal end in a N-sided polygon, where N is an integer, each of the outer rails having two outer rail longitudinal ends, each of the two outer rail longitudinal ends coupled to one of the longitudinal outer rail ends of another one of the outer rails;
    wherein the N number of outer rails are tubes that form a continuous tube that form the N-sided polygon;
    an N number of inner rails, each of the inner rails having a first longitudinal end coupled to one of the outer rails and a second longitudinal end coupled to another one of the inner rails; and
    an N number of mount slots, each between one of the inner rails and an adjacent one of the outer rails.

\* \* \* \* \*